(12) United States Patent
Di Filippi et al.

(10) Patent No.: US 12,424,870 B2
(45) Date of Patent: Sep. 23, 2025

(54) SYSTEM AND METHOD FOR INTELLIGENT POWER CONVERTER CONTROL OF FUEL CELLS AND OTHER AUXILIARY POWER SOURCES

(71) Applicant: Vertiv Corporation, Columbus, OH (US)

(72) Inventors: Arturo Di Filippi, Bologna (IT); Graziano Galuppi, Imola (IT); Giovanni Zanei, Faenza (IT); Peter Panfil, Columbus, OH (US); Michele Venturini, Voghenza (IT)

(73) Assignee: VERTIV CORPORATION, Westerville, OH (US)

( * ) Notice: Subject to any disclaimer, the term of this patent is extended or adjusted under 35 U.S.C. 154(b) by 512 days.

(21) Appl. No.: 17/983,698

(22) Filed: Nov. 9, 2022

(65) Prior Publication Data
US 2023/0155412 A1 May 18, 2023

Related U.S. Application Data

(60) Provisional application No. 63/264,147, filed on Nov. 16, 2021.

(51) Int. Cl.
*H02J 9/06* (2006.01)
*H01M 8/04223* (2016.01)
(Continued)

(52) U.S. Cl.
CPC ......... *H02J 9/061* (2013.01); *H01M 8/04228* (2016.02); *H01M 8/04268* (2013.01);
(Continued)

(58) Field of Classification Search
CPC ......... H01M 8/04228; H01M 8/04268; H01M 8/1018; H01M 8/1246; H01M 16/006; H02J 9/061; H02J 7/0013
(Continued)

(56) References Cited

U.S. PATENT DOCUMENTS

| | | | |
|---|---|---|---|
| 7,772,716 B2 * | 8/2010 | Shaver, II | H10F 77/955 307/31 |
| 2009/0160259 A1 * | 6/2009 | Naiknaware | H02M 7/4807 307/82 |

(Continued)

FOREIGN PATENT DOCUMENTS

| | | |
|---|---|---|
| CN | 102593942 A | 7/2012 |
| KR | 101201522 B1 | 11/2012 |

OTHER PUBLICATIONS

International Search Report and Written Opinion, International Application No. PCT/US2022/049675, mailed Mar. 3, 2023.

*Primary Examiner* — James M Erwin
(74) *Attorney, Agent, or Firm* — HARNESS, DICKEY & PIERCE, P.L.C.

(57) ABSTRACT

The present disclosure is directed to systems and methods involving a power converter and various control schemes in which the power converter is able to monitor and intelligently manage various operational scenarios such as startup and shutdown of a fuel cell, load sharing among two or more available power sources, and exporting excess power from one available power source to a different power source, as well as transient step up and step down load situations requiring an immediate increase or decrease in the power being provided to a load. Various hierarchical power converter control schemes are also disclosed for addressing different types of operational scenarios, which enable the power converter to centrally manage some or all of the available power sources to optimally use all of the power supplying resources available to it to best meet the requirements of the load.

20 Claims, 17 Drawing Sheets

(51) Int. Cl.
*H01M 8/04228* (2016.01)
*H01M 8/1018* (2016.01)
*H01M 8/1246* (2016.01)
*H01M 16/00* (2006.01)
*H02J 7/00* (2006.01)
*H01M 8/10* (2016.01)
*H01M 8/12* (2016.01)

(52) U.S. Cl.
CPC ....... H01M 8/1018 (2013.01); H01M 8/1246 (2013.01); H01M 16/006 (2013.01); H02J 7/0013 (2013.01); *H01M 2008/1095* (2013.01); *H01M 2008/1293* (2013.01)

(58) Field of Classification Search
USPC ............................................................ 429/9
See application file for complete search history.

(56) References Cited

U.S. PATENT DOCUMENTS

| | | | |
|---|---|---|---|
| 2010/0198421 A1* | 8/2010 | Fahimi | H02J 3/381 700/291 |
| 2012/0173035 A1* | 7/2012 | Abe | H02J 3/00 700/297 |
| 2018/0037121 A1* | 2/2018 | Narla | H02J 3/38 |
| 2021/0029896 A1 | 2/2021 | Zhang et al. | |
| 2021/0249896 A1* | 8/2021 | Panfil | H02J 9/061 |

* cited by examiner

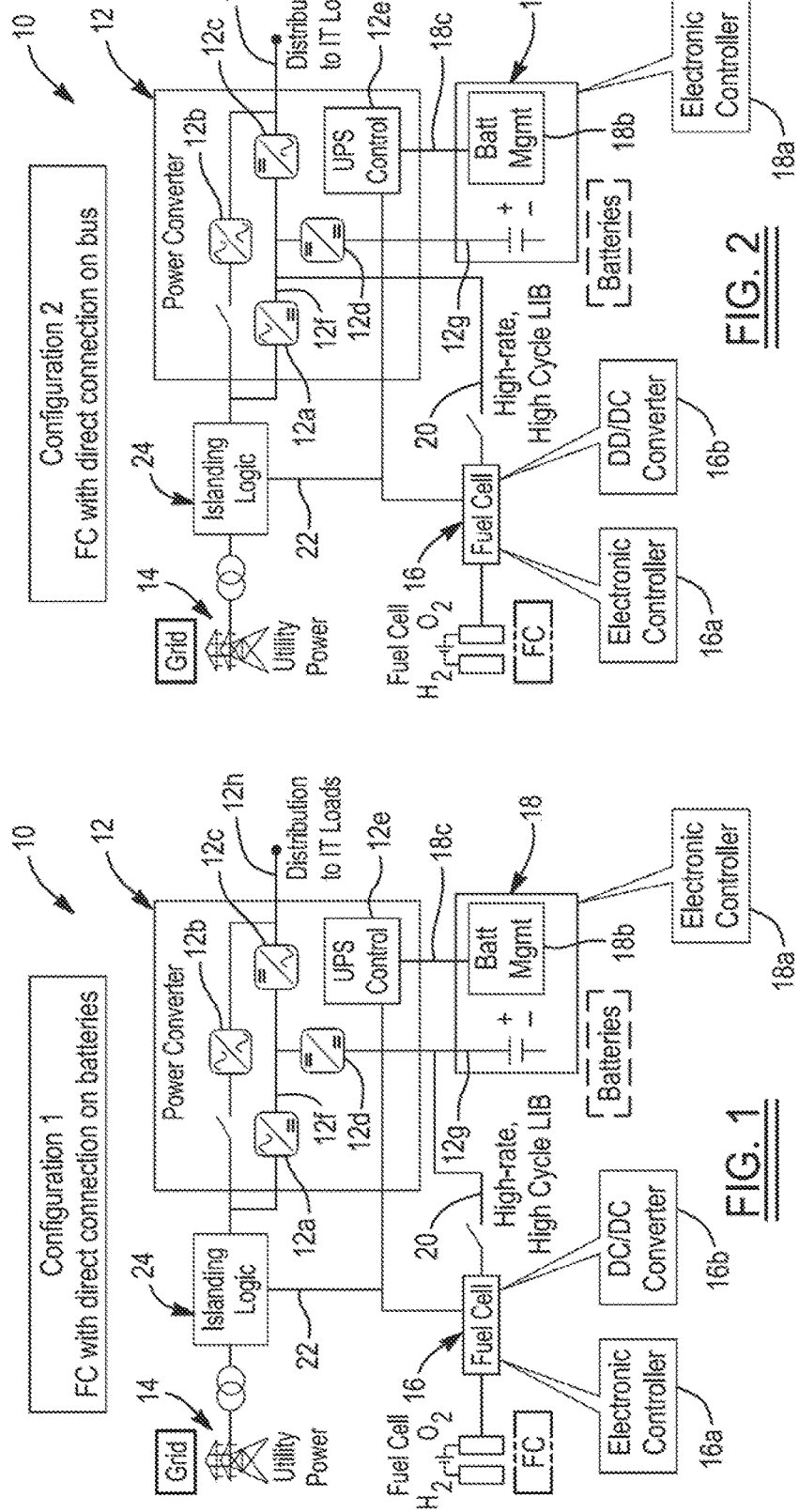

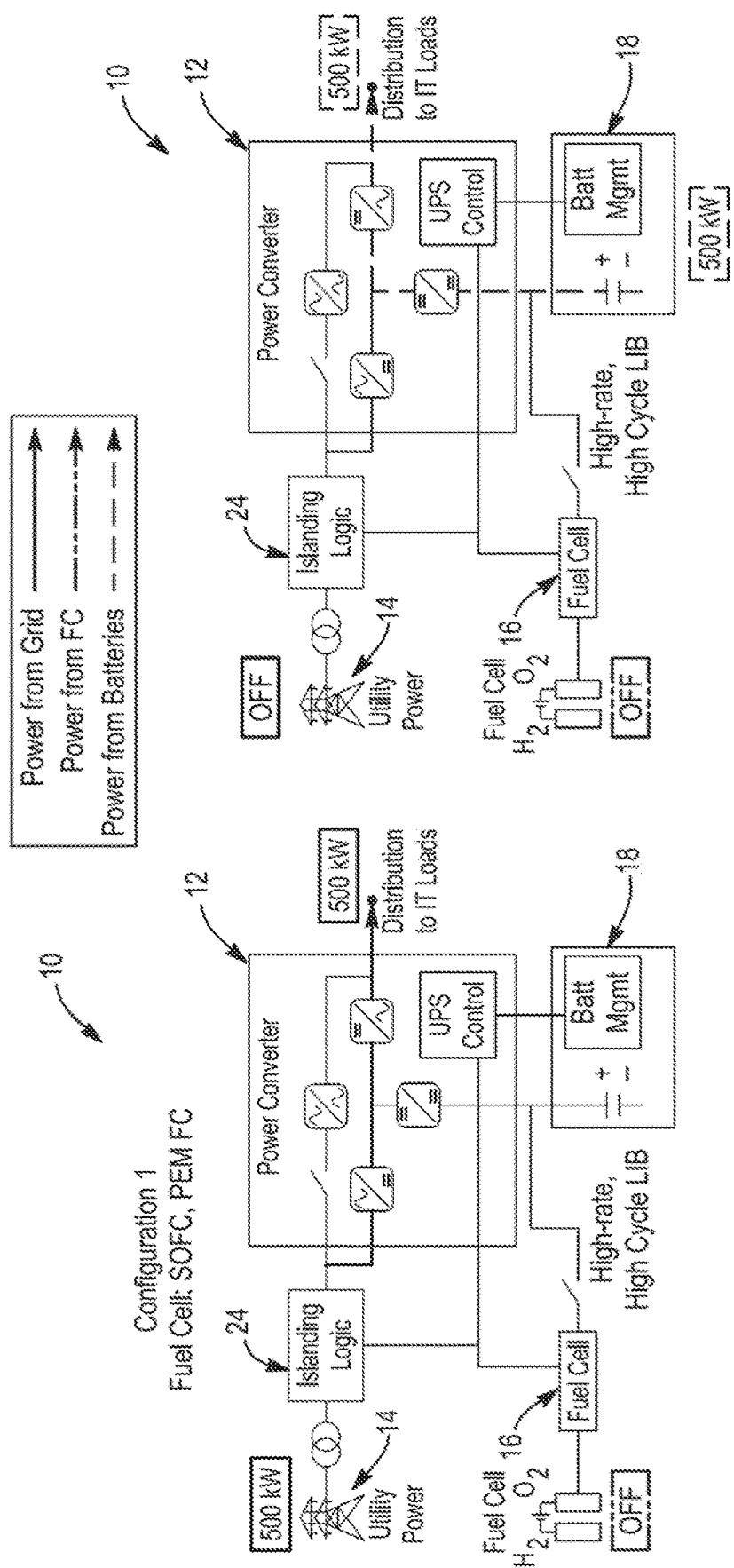

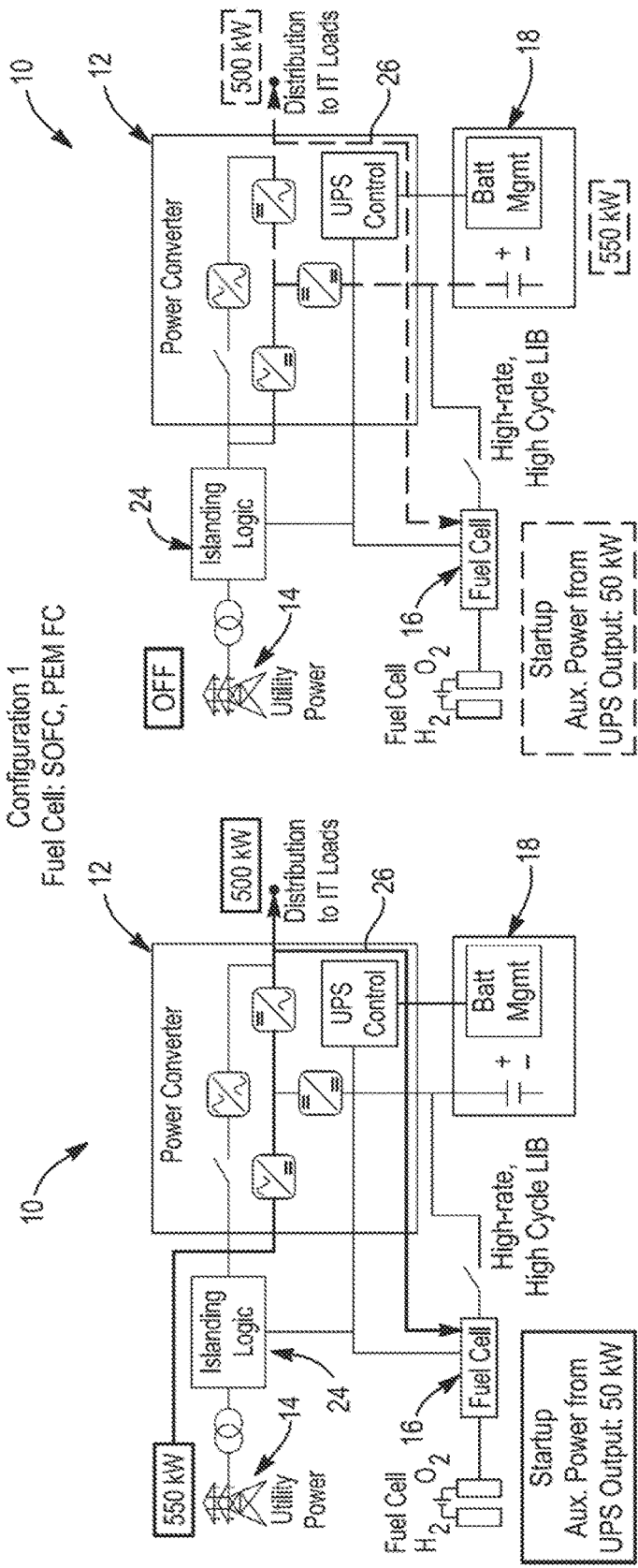

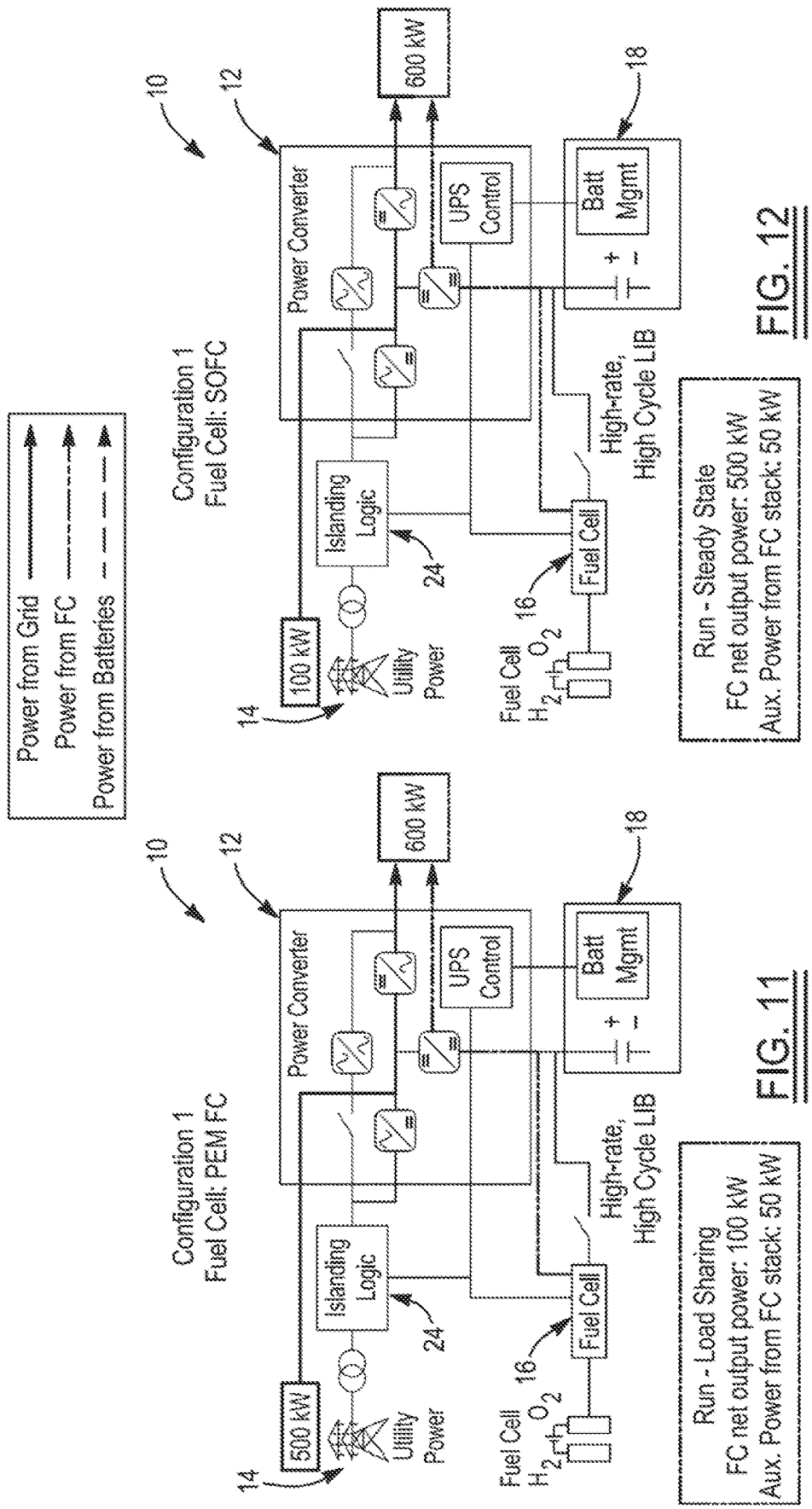

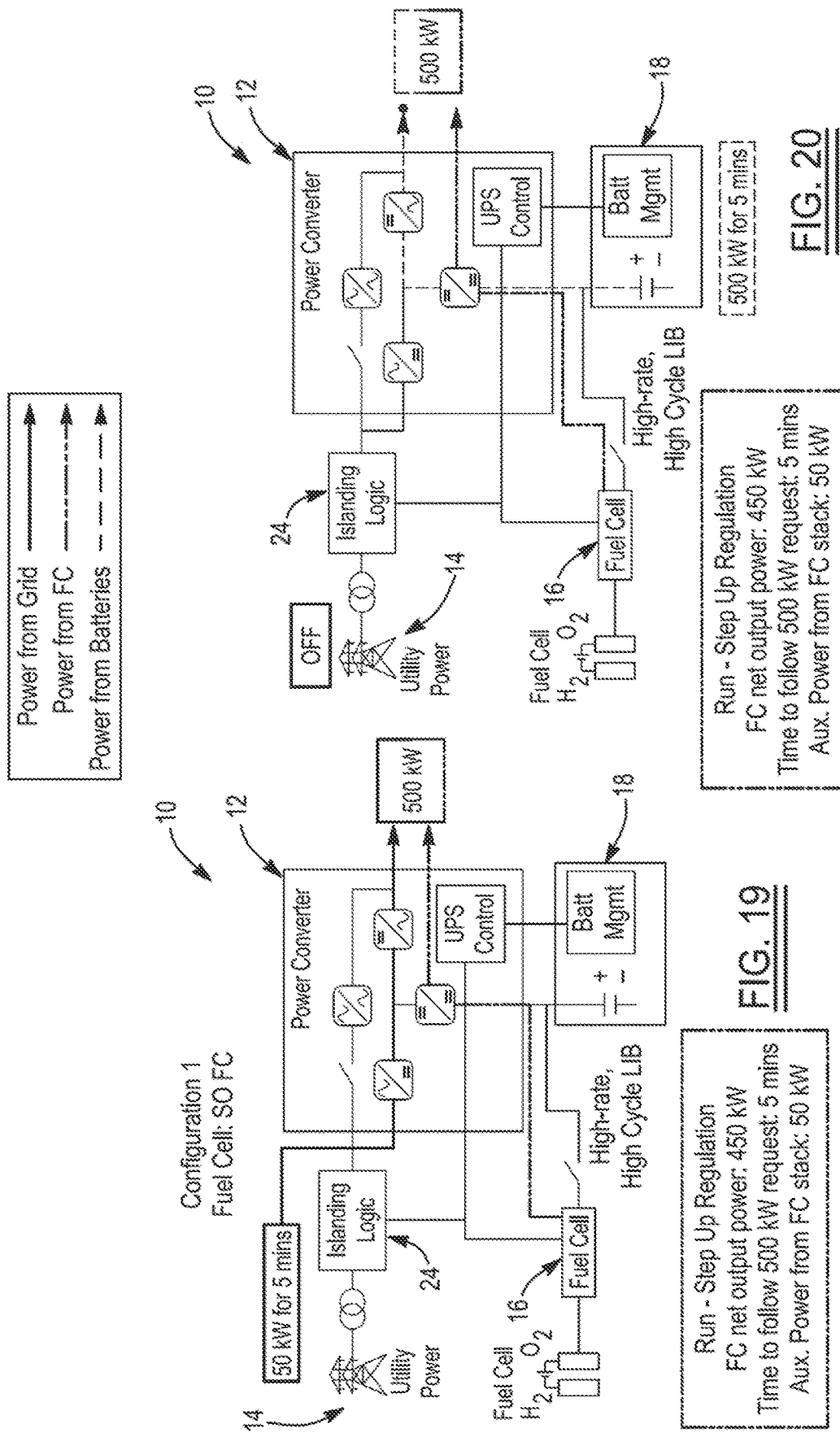

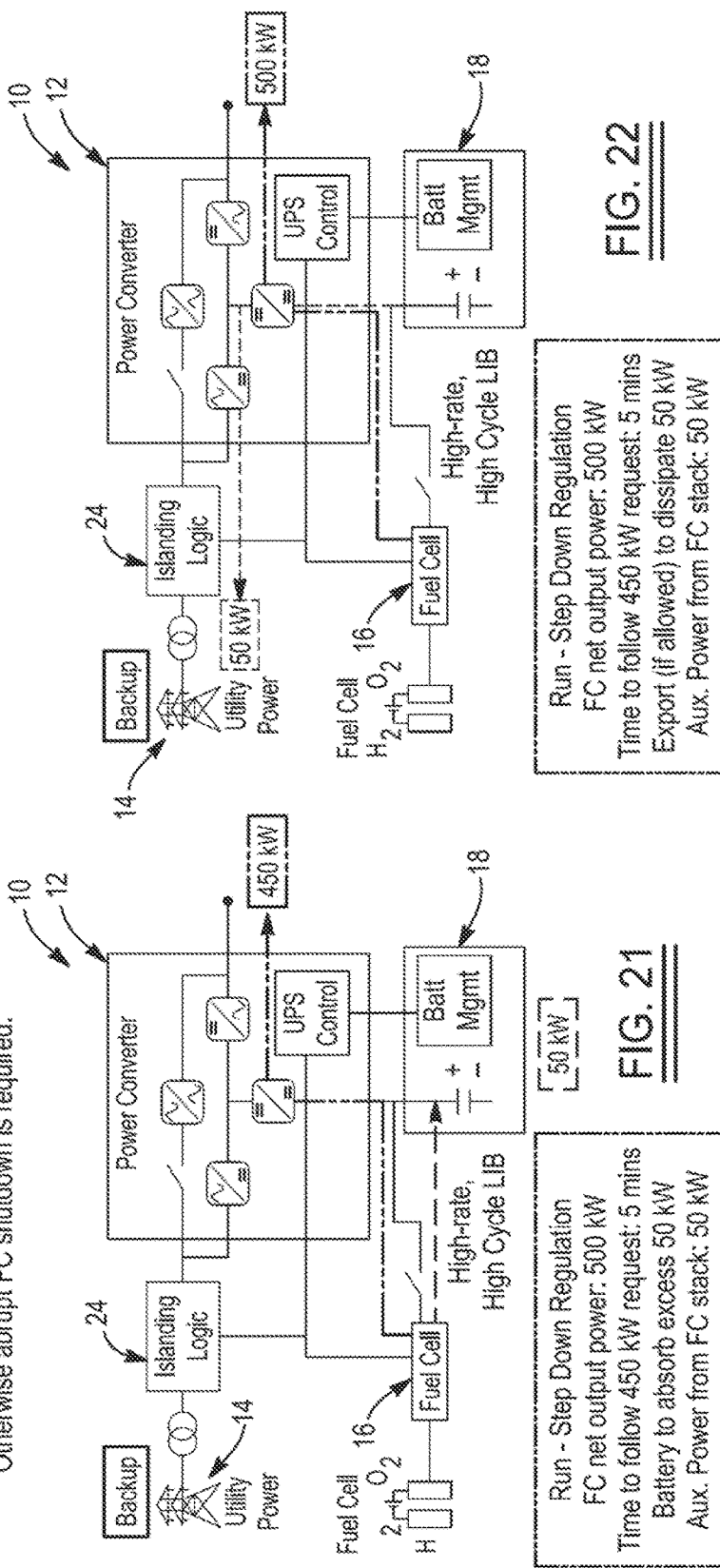

SYSTEM AND METHOD FOR INTELLIGENT POWER CONVERTER CONTROL OF FUEL CELLS AND OTHER AUXILIARY POWER SOURCES

CROSS-REFERENCE TO RELATED APPLICATIONS

This application claims the benefit of U.S. Provisional Application No. 63/264,147, filed on Nov. 16, 2021. The entire disclosure of the above application is incorporated herein by reference.

FIELD

The present disclosure relates to power converters, also known as uninterruptible power supplies ("UPSs"), and more particularly to systems and implementations of power converters which enable a power converter to communicate with, control or manage one or more auxiliary power sources, and/or to coordinate transmitting excess power back onto a power grid or back to an auxiliary power source, and/or to handle various transient step up and step down load conditions, as well as fuel cell startup and shutdown scenarios, and generally to optimize overall use and/or storage of available energy accessible by the power converter.

BACKGROUND

The statements in this section merely provide background information related to the present disclosure and may not constitute prior art.

Power converters, often referred to as "uninterruptible power supplies" ("UPSs"), are now widely used as auxiliary power sources to support critical infrastructure loads in a wide variety of settings including, but not limited to, hospital and health care entities, financial institutions, manufacturing entities, governmental entities, and data center applications, just to name a few important applications. Power converters have become critically important in ensuring that momentary or short-term power outages occurring on a local power grid will not cause a shutdown of important electric power dependent equipment being powered from the power grid. The assignee of the present disclosure is a leader in state-of-the-art power converter systems which are presently being used widely throughout the world in a wide range of industries to support wide ranging critical applications.

In present day implementations, typically one or more auxiliary power sources are also used in connection with a power converter to provide auxiliary power to the power converter, or directly to a load, in the event of a power outage situation on an AC power grid. This is to address the possibility in which a local or widespread AC power grid outage extends beyond the run time capability, or the load supporting capability, of the power converter. In this instance such auxiliary power sources will take over supplying power to a load if/when the load requirements exceed those which the power converter is able to meet. Such additional auxiliary power sources may include, without limitation, diesel powered electric generators, long term batteries such as Lithium Ion batteries ("LIBs") and others, and/or fuel cells such as solid oxide fuel cells ("SOFCs") and proton exchange membrane fuel cells ("PEMFCs", also known as polymer electrolyte membrane fuel cells). Still further, the use of intermediate term or short term rechargeable external supplemental battery systems, which are often of lithium ion construction and sometimes referred to as "short term LIBs," are now being used to provide auxiliary power directly to a power converter, to further augment the output capacity of a power converter or to charge the internal batteries of the power converter.

While use of power converters in a great variety of applications has proliferated in recent years, little has been done to make use of a power converter in monitoring, communicating with and managing the various auxiliary power sources that are often available to provide power to a load that the power converter is associated with. More specifically, presently available commercial power backup and management systems that include one or more power converters have not addressed how to harness the capabilities of present-day power converters and the other available, longer duration auxiliary power sources in intelligent ways. For example, presently available power backup systems have not made use of the intelligent control capabilities inherent with present day power converters to monitor and manage the application of auxiliary power to a load, or to use the power converter to help monitor and manage the application of excess power available on a power grid to help charge the internal batteries of a power converter, or to manage excess power available on a short term basis from an auxiliary fuel cell, or to use the capacity of an available fuel cell to help manage transient load needs, or to manage load sharing between the power converter and other auxiliary power sources, or to manage fuel cell operating set points, or to help charge an external, supplemental battery system that is operatively associated with the power converter, or to accomplish other helpful operations to optimize overall system operation and intelligent use of the available power from a power grid together with different auxiliary power sources.

Accordingly, there remains a strong need for systems and methods that can use a power converter in highly intelligent ways to monitor and manage power being received from a power grid, as well as power being used, or readily available from, a wide variety of auxiliary power sources, in a manner which optimizes the use of all available power under a number of different operating scenarios and conditions.

SUMMARY

This section provides a general summary of the disclosure, and is not a comprehensive disclosure of its full scope or all of its features.

In one aspect the present disclosure relates to a system for managing available electrical power use from a plurality of available power sources. The system may comprise an uninterruptible power supply (UPS) having a rectifier circuit, a DC/AC inverter circuit, a DC/DC charger circuit, an AC/AC bypass circuit, a main internal DC bus, and an electronic controller, the UPS providing an AC power output to a load. The system may also include an islanding logic subsystem configured to communicate with an AC power grid. The system may further include a fuel cell remote from the UPS and having an electronic controller for providing DC power to the UPS. The system may further include a supplemental battery subsystem (SBS) having an electronic controller and configured to provide supplemental DC power to the UPS. The system may further include a first external bus configured to couple an output of the SBS to the DC/DC converter of the UPS, and a second external bus configured to couple an output of the fuel cell to at least one of the main internal DC bus of the UPS or the first external bus, for providing auxiliary DC power from the fuel cell to the UPS. The system may further include a control signal bus configured to communicate control signals between the electronic controller of the UPS, the electronic controller of the fuel cell and the electronic controller of the SBS. The electronic controller of the UPS may be configured to communicate with the electronic controller of the SBS, the electronic controller of the fuel cell and the islanding logic subsystem via the control signal bus. The electronic controller of the UPS is thereby configured to enable the UPS to manage a use of available power from at least one of the AC power grid, the fuel cell or the SBS in accordance with a predetermined hierarchical supply power prioritization plan.

In another aspect the present disclosure relates to a method for managing available electrical power use from a plurality of available power sources. The method may comprise providing an uninterruptible power supply (UPS) having a main internal DC bus, and an electronic controller, the UPS providing an AC power output to a load. The method may further include using the UPS to communicate with an electronic controller of an islanding logic subsystem associated with an AC power grid, and further using the UPS to communicate with an electronic controller of a fuel cell remote from the UPS, wherein the fuel cell is configured to provide power to the UPS to at least assist the UPS in powering the load. The method may further include using the UPS to communicate with an electronic controller of a supplemental battery subsystem (SBS), where the SBS is configured to selectively provide supplemental DC power to the UPS. The electronic controller of the UPS may be configured to communicate with the electronic controller of the SBS, the electronic controller of the fuel cell and the electronic controller of the islanding logic subsystem to enable the UPS to manage a use of any available power from at least one of the AC power grid, the fuel cell or the SBS in accordance with a predetermined hierarchical supply power prioritization supply plan.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 1 shows one configuration of a system in accordance with the present disclosure in which a power converter is configured to directly receive DC power from a fuel cell as well as DC power from a short term, high-rate, high cycle supplemental battery system (SBS), on a DC bus which couples the fuel cell and the SBS to the power converter, and where a control communication bus extends between the electronic controller of the power converter, the fuel cell and an islanding logic subsystem associated with the power grid;

FIG. 2 shows another configuration of the system in which the fuel cell and DC bus of FIG. 1 are instead coupled to an internal DC bus of the power converter;

FIG. 3 shows the system of the FIG. 1 configuration in which the power converter uses only power available from the power grid to fully support the load while a fuel cell is present but unavailable for use;

FIG. 4 shows the system of the FIG. 3 configuration, but where both the power grid and the fuel cell are unavailable, and the power converter instead uses only power supplied by the SBS to fully support the load;

FIG. 5 shows the system of the FIG. 1 configuration, and where the power converter controls a fuel cell startup operation by obtaining additional power needed for the startup operation from the power grid;

FIG. 6 shows the system of the FIG. 5 configuration, but where the power grid is unavailable for use, and the power converter instead obtains the additional power needed for the fuel cell startup process entirely from the SBS;

FIG. 11 is a view of the system as shown in FIG. 1 with the power converter of the system being used to control load sharing;

FIG. 12 shows the system of FIG. 11, but where the power converter is using power from both the power grid and from a fuel cell to cooperatively power the load;

FIG. 19 shows the system of FIG. 18 but where the fuel cell is a SOFC which is fully supplying the load when the transient step up load condition arises, and the power converter instead obtains the needed additional short term power from the power grid to meet increased transient step up load condition and fully power the load;

FIG. 20 shows the system of FIG. 18 but where the fuel cell is a SOFC and is fully powering the load when a transient step up load condition arises, and the power grid is offline, and further showing how the power converter obtains the additional needed short term power from the SBS to fully meet the transient step up load condition and fully power the load;

FIG. 21 shows the system configured as presented in FIG. 1, but where the fuel cell is fully powering the load when a step down transient load condition occurs, and showing how the power converter diverts a portion of the fuel cell's output to the SBS to charge the batteries of the SBS;

FIG. 22 shows the system of FIG. 21 but where the power converter addresses the step down transient load condition by exporting a portion of the fuel cell's output to the power grid;

DETAILED DESCRIPTION

Figure 7:
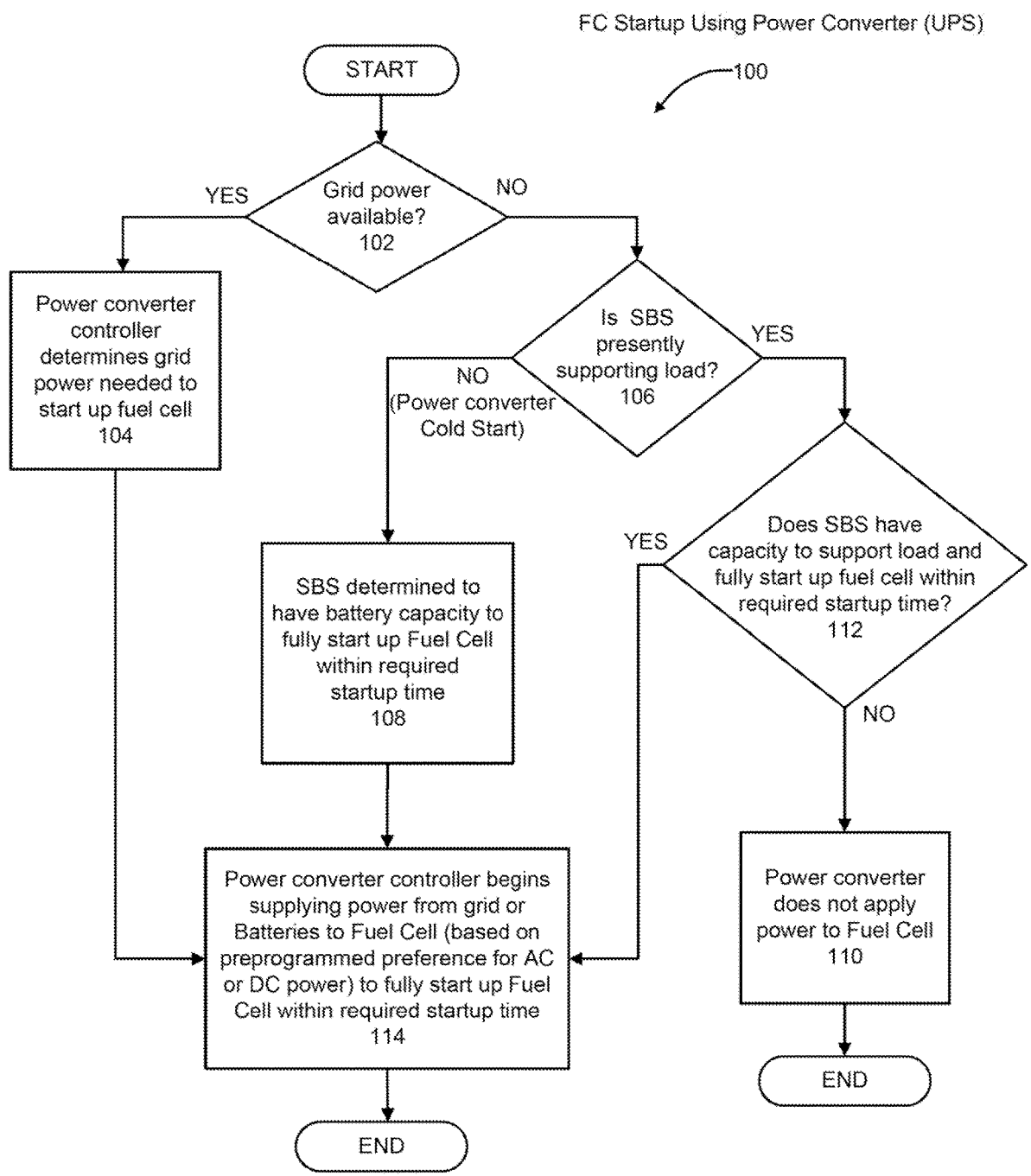
FIG. 7 is a flowchart further highlighting various operations that may be performed by the power converter in carrying out a fuel cell startup process.

Example embodiments will now be described more fully with reference to the accompanying drawings.

Referring to FIG. 1, one embodiment of a system 10 in accordance with the present disclosure is shown for using a power converter 12 (also known as an "uninterruptible power supply" or "UPS") to intelligently manage the use of available power from a power grid 14, an auxiliary power source shown in this example as a fuel cell 16, and a high-rate, high cycle supplemental battery subsystem ("SBS") 18 (often constructed as a lithium ion battery subsystem and often referred to in the industry simply as an "LIB" for short). The SBS 18 may have capacity to handle the needs of the load for a short term (e.g., an hour or longer) or for a longer intermediate term (e.g., 48 hours). In this embodiment the power converter 12 includes a rectifier circuit 12a, an AC/AC bypass circuit 12b, a DC/AC inverter circuit 12c, a DC/DC charger circuit 12d, an internal electronic controller 12e, a main internal DC bus 12f, a first external DC bus 12g, and an AC power output bus 12h. The first external DC bus 12g couples the DC/DC charger circuit 12d of the power converter 12 to a DC input of the SBS 18. A second external DC bus 20 couples a DC output of the fuel cell 16 to the first external DC bus 12g. And while the auxiliary power source shown in FIG. 1 is the fuel cell 16, it will be appreciated that the present disclosure is not limited to use with only fuel cells, but could readily be modified for use with other types of auxiliary fuel sources, such as a diesel powered generator, a natural gas powered generator or a long term LIB.

The system 10 of FIG. 1 also includes a control signal bus 22 which couples the internal electronic controller 12e of the power converter 12 with an electronic controller 16a of the fuel cell 16. The control signal bus 22 also communicates with an islanding logic subsystem 24 associated with the power grid 14. The islanding logic subsystem 24 may include a conventional subsystem well known in the industry for preventing the back flow of power into the power grid 14 under certain conditions, and will therefore not be described in detail here. The fuel cell 16 in one configuration may also include a DC/DC converter 16b which is coupled to its DC input port (not shown), and therefore communicates with the second external bus DC 20 to facilitate the transfer of DC power to and from the fuel cell 16 and other components of the system 10, which will be explained more fully in the following paragraphs. The SBS 18 also includes an internal electronic controller 18a which may communicate with the electronic controller 12e of the power converter 12, as well as with the electronic controller 16a of the fuel cell 16, and possibly also with the islanding logic subsystem 24. Accordingly, each of the electronic controllers 12e, 16a and 18a, and the islanding logic subsystem 24, may communicate information between them via the control signal bus 22. The SBS 18 also includes a battery management subsystem 18b for helping to manage communications with the power converter 12 via a communications bus 18c which is in communications with the control signal bus 22.

FIG. 2 shows the system 10 with a modification in which the second external DC bus 20 is instead directly coupled to the internal DC bus 12f of the power converter 12. In this manner DC power can be transmitted directly between the internal DC bus 12f and the second external DC bus 20.

The system 10 as shown in FIGS. 1 and 2 enables the power converter 12 to control the interface between the SBS 18 and the fuel cell 16, as well as the interfacing of these components with the load. The system 10 also enables the power converter 12 to manage operational set points of the fuel cell 16 to address transient loads that are sensed by the power converter 12 to more quickly and efficiently implement load sharing if/when needed with the power grid 14 and the SBS 18. The power converter 12 is also able to control the diverting of excess power from the fuel cell 16 that may become available if the load suddenly drops while the load is being powered from the fuel cell 16, for example to charge the internal batteries of the power converter 12 or to charge the batteries of the SBS 18. The system 10 as shown in FIGS. 1 and 2 also enables the power converter 12 to manage exporting power back onto to the power grid 14 (if this is permitted by the utility) if the fuel cell 16 is powering the load and a sudden drop in the load occurs, leaving a surplus of power available for a period of time.

It will also be appreciated that while the system 10 contemplates the use of a plurality of different types of auxiliary power sources, two types in particular are expected to be especially popular, with those being solid oxide fuel cells ("SOFCs") and proton exchange membrane fuel cells ("PEMFCs", also known as polymer electrolyte membrane fuel cells). If an SOFC is used as the fuel cell 16, then more typically it will be used to provide main power to the load, and the power grid 14 will be used as a backup power supply. This is because of the physical makeup of an SOFC, which takes a significantly longer time to start up as well as to shut down (e.g., up to 24 hours in some cases). SOFCs also typically work at very high temperatures (e.g., 750/800° C.), so every time an SOFC switches on and off it may suffer thermal gradients that can, over time, be harmful for stack life. In addition, SOFCs often work with natural gas and have higher efficiencies than a PEMFC, which makes the SOFC a more suitable choice for use as a prime power source in most power supplying applications. Conversely, if a PEMFC is used, it will more typically be used as a backup power source, as it is capable of responding much more quickly than a SOFC.

FIGS. 3 and 4 further show how the system 10 operates when it is configured as shown in FIG. 1, with the second external DC bus 20 communicating directly with the first external DC bus 12g. As shown in FIG. 3, with the fuel cell 16 powered off and with the load supported entirely by the power grid 14, the power grid supplies power to the power converter 12, which in turn provides an AC output signal at its output bus 12h to the load.

FIG. 4 shows the system 10 as configured in FIG. 1 but with both the power grid 14 and the fuel cell 16 offline. In this operating scenario the SBS 18 may be controlled by the electronic controller 12e of the power converter 12 to provide power over the first external DC bus 12g to the DC/DC charging subsystem 12d of the power converter 12. The power converter 12 uses this DC power to generate at the DC/AC inverter circuit 12c an AC output signal on its output 12h to power the load. Communications between the electronic controller 12e of the power converter 12 and the electronic controller 18a of the SBS 18 may be used to initiate and to stop the application of power from the SBS 18. The transition from using SBS 18 supplied power to power grid 14 supplied power, or vice versa, may occur seamlessly through suitable control signals applied by the electronic controller 12e of the power converter 12 to the SBS electronic controller 18a and/or to the islanding logic subsystem 24, in real time, as operating conditions change.

Referring now to FIGS. 5 and 6, the system 10 of FIG. 1 is shown implementing two different control scenarios to carry out a startup operation of the fuel cell 16. In FIG. 5 power is available from the power grid 14. In this scenario the system 10 may prioritize use of the power grid 14 to help provide the startup power necessary to bring the fuel cell 16 online. The electronic controller 12e of the power converter 12 controls internal switching subsystems within the power converter to route a portion of the AC output power back over a separate AC bus 26 to an AC power input (not shown) of the fuel cell 16. This assumes that the fuel cell 16 in this instance is an AC powered fuel cell or at least has a provision for receiving an AC input signal. In this specific example, the power grid 14 is providing 500 kW through the power converter 12 to the load, and 50 kW is required to begin heating the stacks of the fuel cell 16 (which typically includes a plurality of stacks arranged together) to bring the fuel cell online. The electronic controller 12e may be preprogrammed with this information, or it may acquire the information from the fuel cell's electronic controller 16a, but in either case it controls the application of the needed 50 kW to the fuel cell 16 to carry out the required heating of the fuel cell. Of course, this is assuming that this amount of power is beyond that presently required by the load. Alternatively, if the fuel cell 16 is directly connected to the power grid 14 and configured to receive AC power, then power (e.g., 230 VAC) may be provided directly from the power grid to the fuel cell 16 to heat the fuel cell.

FIG. 6 shows another operational scenario that can be handled by the system 10 while in its configuration shown in FIG. 1. In this example the power grid 14 is not available for AC power, and the SBS 18 is being used to power the load. The electronic controller 12e of the power converter 12 communicates with the electronic controller 18a of the SBS 18 to determine the available capacity of the SBS 18 and, provided sufficient capacity is available, draws the additional power needed to heat the stacks of the fuel cell 16. In the example shown in FIG. 6, the load requires 500 kW, so the electronic controller 12e commands the power converter 12 to draw 550 kW, and then provides 50 kW to the fuel cell 16 via the AC bus connecting the output bus 12h to the AC input (not shown) of the fuel cell 16. Once the fuel cell 16 is fully powered up, the electronic controller 12e will control the power converter 12 to stop drawing power from the SBS 18, or to reduce its power draw to only what is needed to help power the load, assuming that the fuel cell 16 is not able to fully power the load by itself.

Referring now to FIG. 7, a high level flowchart 100 is shown of various operations that the electronic controller 12e of the power converter 12 of the system 10 may perform when the power converter is controlling the startup of the fuel cell 16. The decision to supply power from the power grid 14 or the SBS 18 to the fuel cell 16 may be based on preprogrammed logic stored in a memory of the electronic controller 12e. Initially the electronic controller 12e makes a check at operation 102 to determine if sufficient additional power from the power grid 14 is available to carry out the startup process. This check may involve the electronic controller 12e checking with an external subsystem (e.g., possibly the island logic subsystem) for the needed information. If the check at operation 102 indicates that grid power is available, then at operation 104 electronic controller 12e determines the grid power needed to start up the fuel cell 16, and at operation 114 the electronic controller 12e begins supplying power from the power grid 14 to fully start up the fuel cell 16. If the check at operation 102 indicates that grid power is not available, then at operation 106 the electronic controller 12e determines if the SBS 18 is presently supporting the load. If it is not, then the electronic controller 12e may determine that the SBS 18 has sufficient battery capacity to fully start up the fuel cell 16 by itself within the required startup time, as indicated at operation 108. Then, at operation 114, the electronic controller 12e of the power converter 12 begins supplying power from the SBS 18 to fully start up the fuel cell 16.

With further reference to FIG. 7, if the check at operation 106 indicates that the SBS 18 is presently supporting the load, then a check is performed by the electronic controller 12e at operation 112 to determine if the SBS 18 has sufficient capacity to support the load while also providing the additional power needed to fully start up the fuel cell 16 within the required startup time. The electronic controller 12e may carry out this check by communicating with the electronic controller 18a of the SBS 18 via the communications bus 18c and the battery management subsystem 18b. If the check at operation 112 produces a "Yes" answer, then the startup operation is carried out at operation 114 using the power from the SBS 18 to fully start up the fuel cell 16. If the check at operation 112 produces a "No" answer, then at operation 110 the power converter 12 does not attempt to provide any power to the fuel cell 16 to begin the fuel cell startup process, and the startup operation is terminated.

Figures 8, 9:
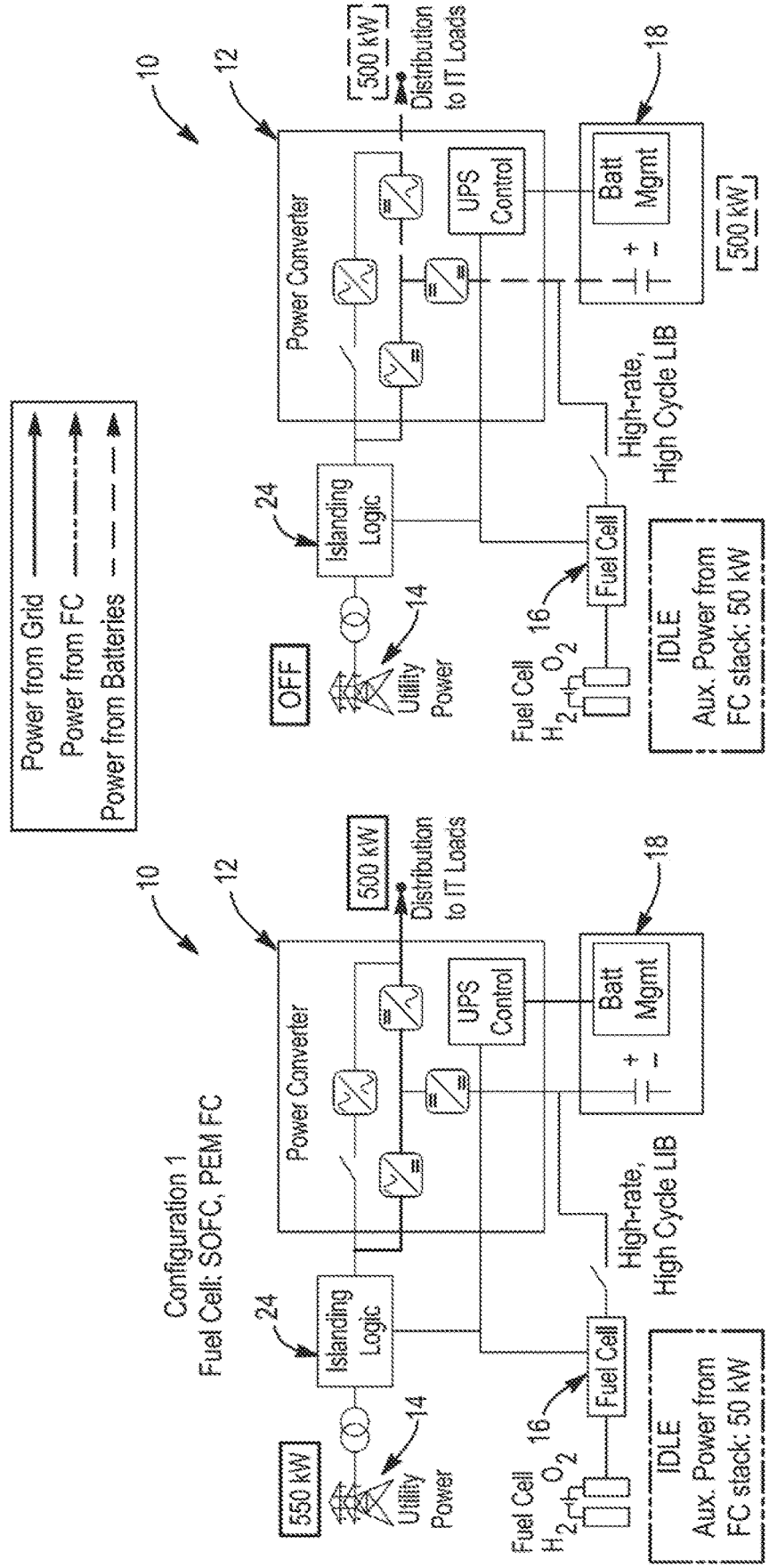
FIG. 8 shows the system as shown configured in FIG. 1, with the load being fully supported by the power grid and the fuel cell powered up and at temperature, but idle, ready for a power walk-in process to be commenced.
FIG. 9 shows the system of FIG. 8 but with the load being fully supported by the SBS and the fuel cell powered up and at temperature, but idle, ready for a power walk-in process to be commenced.
Figure 10:
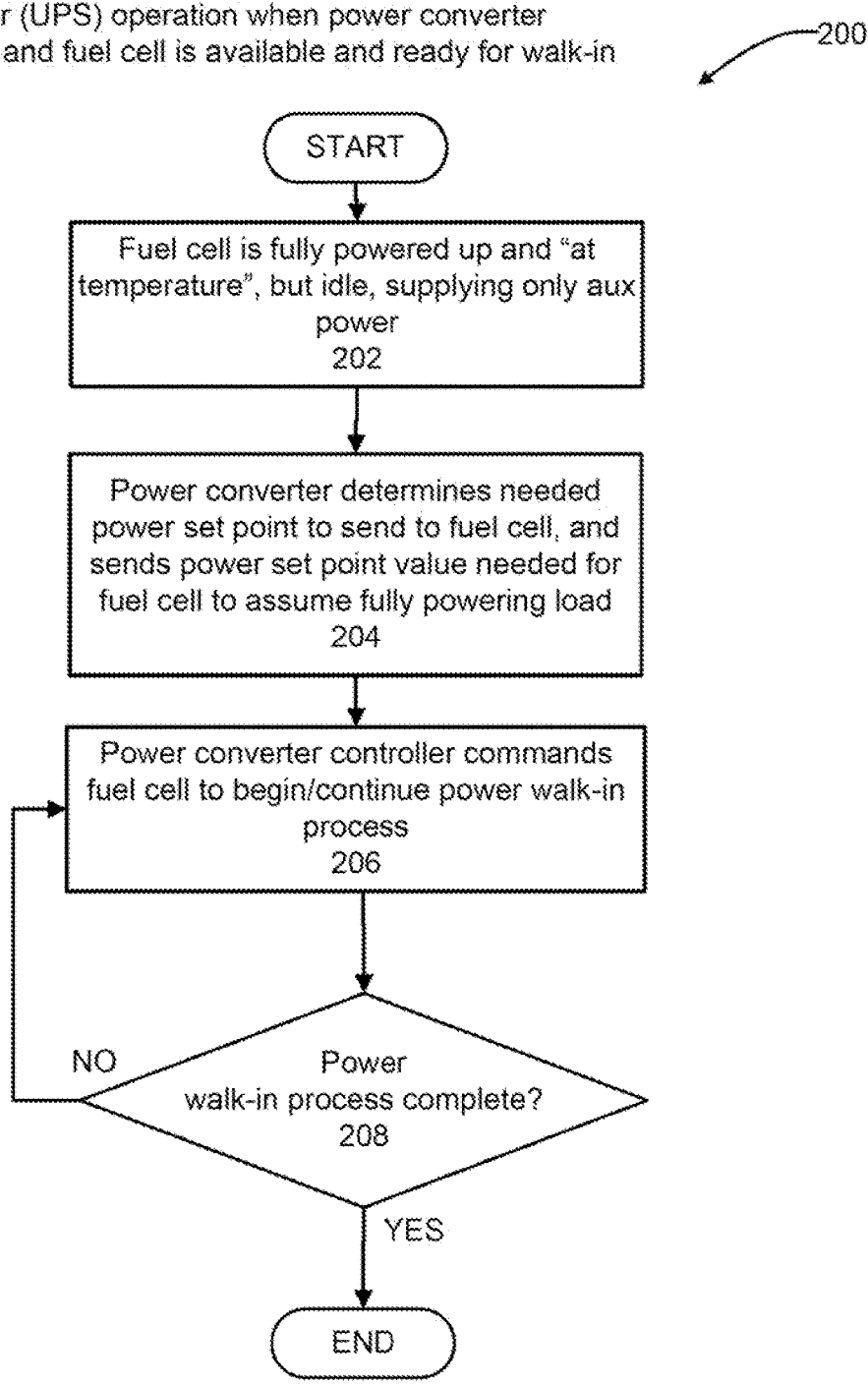
FIG. 10 is a high level flowchart illustrating operations that the power converter electronic controller may perform in communicating with the fuel cell to carry out a power walk-in operation for the fuel cell.

Referring now to FIGS. 8-10, an operational scenario will be explained using the system 10 as configured in FIG. 1 to carry out a walk-in process for the fuel cell 16. Under this scenario, in both FIGS. 8 and 9, the fuel cell 16 startup is complete but the fuel cell 16 is idle (i.e., not supplying any power to the load), but supplying sufficient auxiliary power (e.g., 50 kW) to maintain its own balance of plant ("BOP"). The load, in this example 500 kW, is being supported entirely by the power grid 14 in FIG. 8. The power converter 12 operates in its traditional manner to receive the output from the power grid 14 and generates an AC output needed on its output bus 12h to fully power the load. However, in FIG. 9, the load is being fully supported instead by the SBS 18.

FIG. 10 shows one example of a high level flowchart 200 showing various operations that the electronic controller 12e of the power converter 12 may use in carrying out the power walk-in process by which the fuel cell 16 will gradually assume the load within a predetermined power walk-in time. Initially at operation 202 the fuel cell 16 is fully powered up and "at temperature", but idle and supplying only auxiliary power (e.g., to maintain its own BOP), as explained above with reference to FIGS. 8 and 9.

At operation 204 the electronic controller 12e of the power converter 12 determines the power set point value needed for the fuel cell to assume fully powering the load (e.g., 500 kW in the example of FIGS. 8 and 9), and the electronic controller 12e then sends the needed power set point value to the electronic controller 16a of the fuel cell 16. At operation 206 the power converter electronic controller 12e commands the electronic controller 16a of the fuel cell 16 to begin the power walk-in process. At operation 208 the electronic controller 12e makes a check to determine if the power walk-in process is complete (i.e., if the load is then fully supported by the fuel cell 16). If this check produces a "No" answer, then operation 206 is repeated to allow the power walk-in process to continue. If the check at operation 208 produces a "Yes" answer, then the power walk-in process is complete. At this point the fuel cell 16 is fully powering the load via an output provided by the power converter 12 at its output bus 12h.

Referring now to FIGS. 11 and 12, an operational scenario will be explained where the system 10 as configured in FIG. 1 manage load sharing among two or more available power sources. In this example the fuel cell 16 is up and running at a maximum, constant output power. However, the load requirements are equal to, or exceed, the output capacity of the fuel cell 16. The power grid 14 and the SBS 18 are both available to provide additional power. FIG. 11 shows a preferred control scheme when the fuel cell 16 is a PEMFC and a majority of the needed power for the load is available from the power grid 14. The electronic controller 12e of the power converter 12 controls internal switching subsystems of the power converter to enable the output from the power grid 14 to be used to help generate a major portion of the required power for the load (in this example 500 kW) and also to enable an additional amount of supplemental power (in this example 100 kW) to be provided from the fuel cell 16 via the second external DC bus 20. In this example, this leaves a small amount (e.g., 50 kW) still available as auxiliary power capacity from the fuel cell 16.

FIG. 12 shows the system 10 with the fuel cell 16 being used as the primary power (the fuel cell 16 being a SOFC in this example), while the power grid 14 is being used as a supplemental power source to supply a minor portion (e.g., 100 kW) of the power needed for the load. Again, the electronic controller 12e of the power converter 12 controls the internal switching subsystems of the power converter to receive the required amount of power from both the power grid 14 and the fuel cell 16 (e.g., 600 kW total in this example) to power the load. In this example a small additional amount of auxiliary power capacity remains available from the fuel cell 16 (50 kW in this example). If the load requirements should increase further somewhat, the electronic controller 12e can communicate with the electronic controller 16a of the fuel cell 16 to command that additional power be provided from the fuel cell, potentially up to the maximum available power output of the fuel cell. Still further power capacity from the SBS 18, which is not being used in this example, is available as well.

Figures 13, 14:
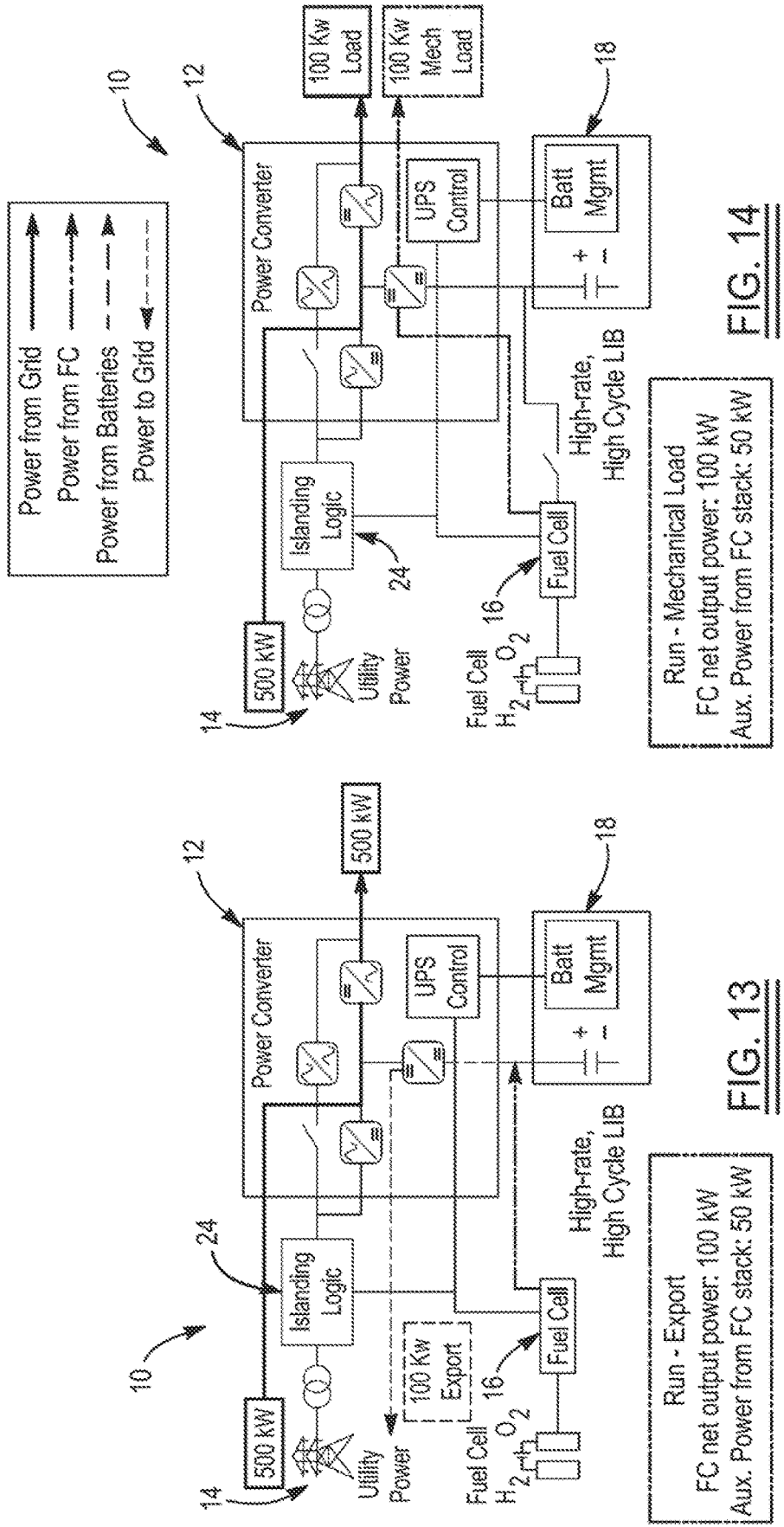
FIG. 13 shows the system as configured in FIG. 1, and where the power grid is being used to support the load, and where the fuel cell is a PEMFC that is running at a steady state producing power that is not needed, and where the power converter exports the PEMFC's power back to the power grid.
FIG. 14 show the system of FIG. 13, but where the power converter instead exports the PEMFC's excess power capacity to an external mechanical load.
Figure 15:
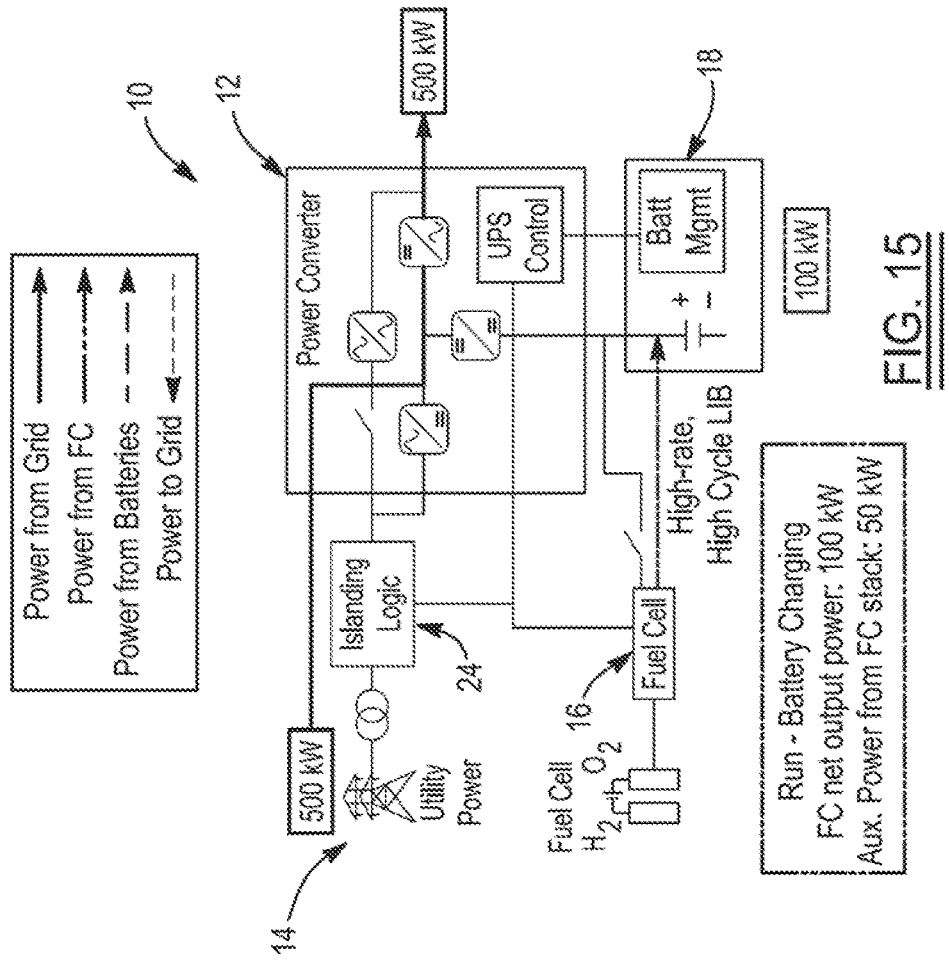
FIG. 15 shows the system of FIG. 13 but where the power converter diverts the PEMFC's excess power to the SBS to charge the batteries of the SBS.

Referring now to FIGS. 13-15, the system 10 in its configuration of FIG. 1 is shown, with the fuel cell 16 being a PEMFC in this example, to illustrate the operational scenario where the fuel cell is providing constant output power which is greater than that required to support the load. In other words, the fuel cell 16 has excess capacity that needs to be managed. The electronic controller 12e of the power converter 12 recognizes this situation and is able to communicate with other available power sources to facilitate the export of a portion of the fuel cell's 16 excess output to one or more of the other available power sources. In FIG. 13 the power grid 14 is supplying the full needed power for the load (i.e., 500 kW in this example), while the fuel cell 14 is outputting a smaller amount of power (100 kW in this example), which is not needed for the load. The electronic controller 12e communicates with the SBS electronic controller 18a and with the islanding logic subsystem 24 and determines, based on information received from the SBS 18 and the power grid 14, as well as using its preprogrammed priority rules, where the excess power from the fuel cell 16 should be exported to. Options are available to export the excess power to the SBS 18 to charge internal batteries of the SBS (FIG. 15) or to the power grid 14 (FIG. 13). Before attempting to use excess power to charge the batteries of the SBS 18, the power converter 12 may calculate the state of charge of the batteries by obtaining information from the SBS on the real time state of charge of its batteries, analyzing the load, and making the needed calculations to determine how much additional charge capacity the batteries can absorb.

FIG. 13 shows that the electronic controller 12e has determined to send the excess power (e.g., 100 kW) back through the power converter 12 to the power grid 14. This avoids the need to throttle down the fuel cell 16 and can add to the efficiency in the operation of the fuel cell, while making optimum use of the fuel cell's available excess power.

FIG. 14 shows another example of the system 10 handling the excess fuel cell 16 output situation, but in this example the electronic controller 12e exports the un-needed output (100 kW in this example) of the fuel cell 16 to an independent mechanical load "ML".

FIG. 15 shows still another example of the system 10 handling the excess fuel cell 16 output situation, but in this example the electronic controller 12e of the power converter 12 determines, through communications with the electronic controller 18a of the SBS 18, that the SBS can accept the full output of the fuel cell (100 kW in this example). The electronic controller 12e then communicates instructions to the electronic controller 16a of the fuel cell 16 to supply its full present output (100 kW in this example) to the SBS 18. The full output of the fuel cell 16 then is used to charge the internal batteries of the SBS 18. Simultaneously, the power converter 12 uses power from the power grid 14 to fully power the load.

Figure 16:
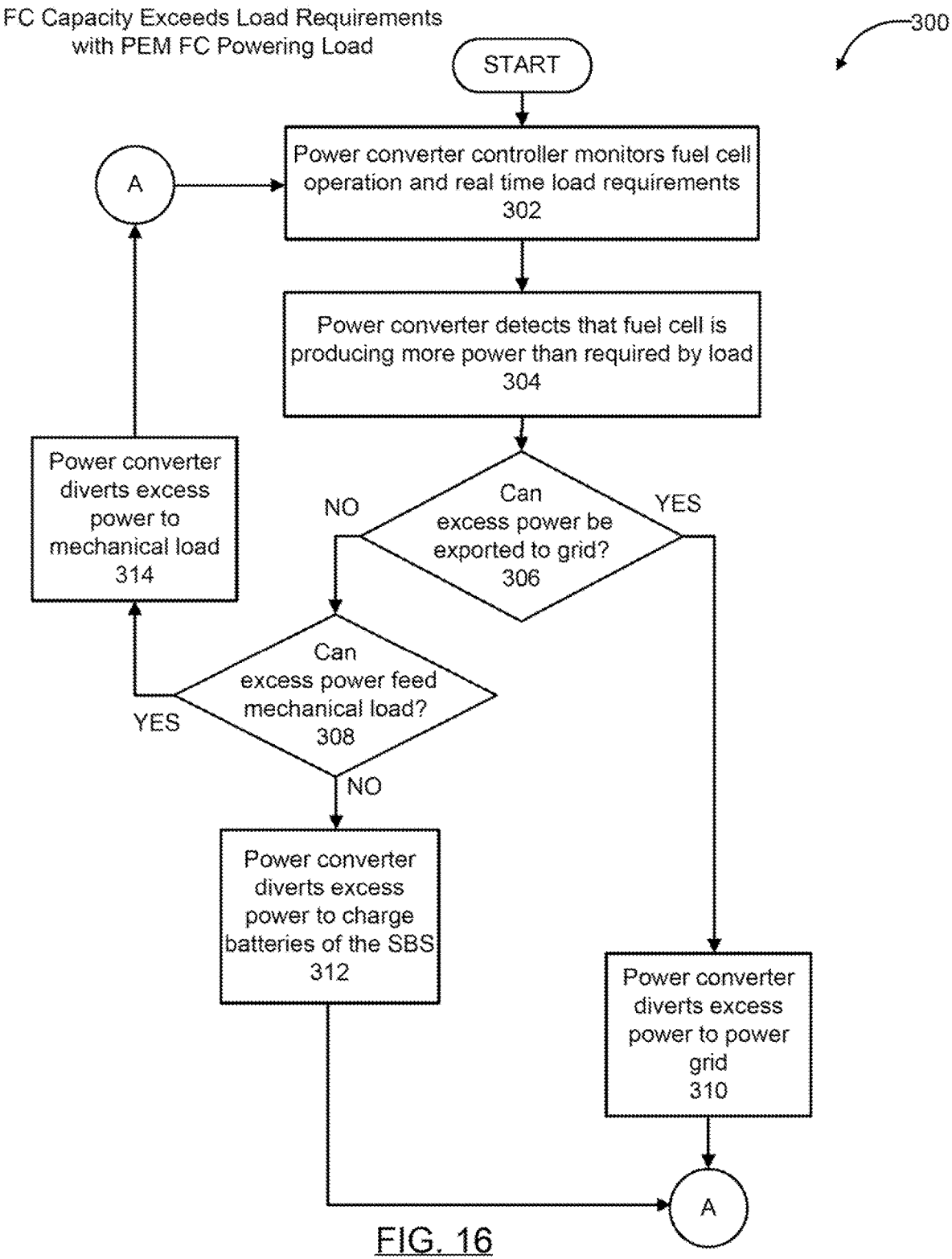
FIG. 16 is a flow chart showing various operations that the electronic controller of the power converter may perform in managing the scenario where the PEMFC is producing excess power which is not needed by the load.

FIG. 16 shows a flowchart 300 which further illustrates one example of the operations described above by which the power converter 12 manages load sharing among two or more available power sources and also decides which one of two or more available power sources the excess output of the PEMFC should be exported to. At operation 302 the power converter electronic controller 12e monitors the fuel cell 16 operation and the real time requirements of the load. At operation 304 the electronic controller 12e detects that the fuel cell 16 is producing more power than required by the load. This situation typically occurs when the load drops (e.g., from 600 kW to 500 kW) over a relatively short period of time. At operation 306 the electronic controller 12e makes a real time check if the now available excess power can be exported to the power grid 14. In this example the power grid 14 is the preferred choice for exporting power to, provided it is available for such purpose at the time. If the check at operation 306 produces a "Yes" answer, then the electronic controller 12e controls its internal switching subsystems to route power from the fuel cell 16 through the power converter 12 back to the power grid 14, as indicated at operation 310, and monitoring of the fuel cell 16 operation continues at operation 302. However, if the check at operation 306 produces a "No" answer, then the electronic controller 12e makes a real time check at operation 308 to determine if a mechanical load, known to the electronic controller 12e in advance to be available for use, has available capacity to receive the excess power from the fuel cell 16. If this check at operation 308 produces a "Yes" answer, then the electronic controller 12e diverts the excess power from the fuel cell 16 to the mechanical load, as indicated at operation 314, and monitoring of the fuel cell 16 operation continues at operation 302.

Referring further to FIG. 16, if the check at operation 308 by the electronic controller 12e indicates that the mechanical load does not have the capacity to receive the excess power from the fuel cell 16, then at operation 312 the electronic controller 12e instructs the fuel cell 16 to supply the excess portion of its output to the SBS 18 to charge the internal batteries of the SBS 18. Monitoring of the fuel cell 16 operation then continues at operation 302. It will be appreciated that this hierarchical priority scheme enables the electronic controller 12e to use all of the available power sources, as well as all of the available mechanical load(s), if needed, to receive excess power from the fuel cell 16. The electronic controller 12e further is able to prioritize which other power sources and/or mechanical load(s) may receive the excess power from the fuel cell 16 to make most efficient use of the excess power.

Figure 17:
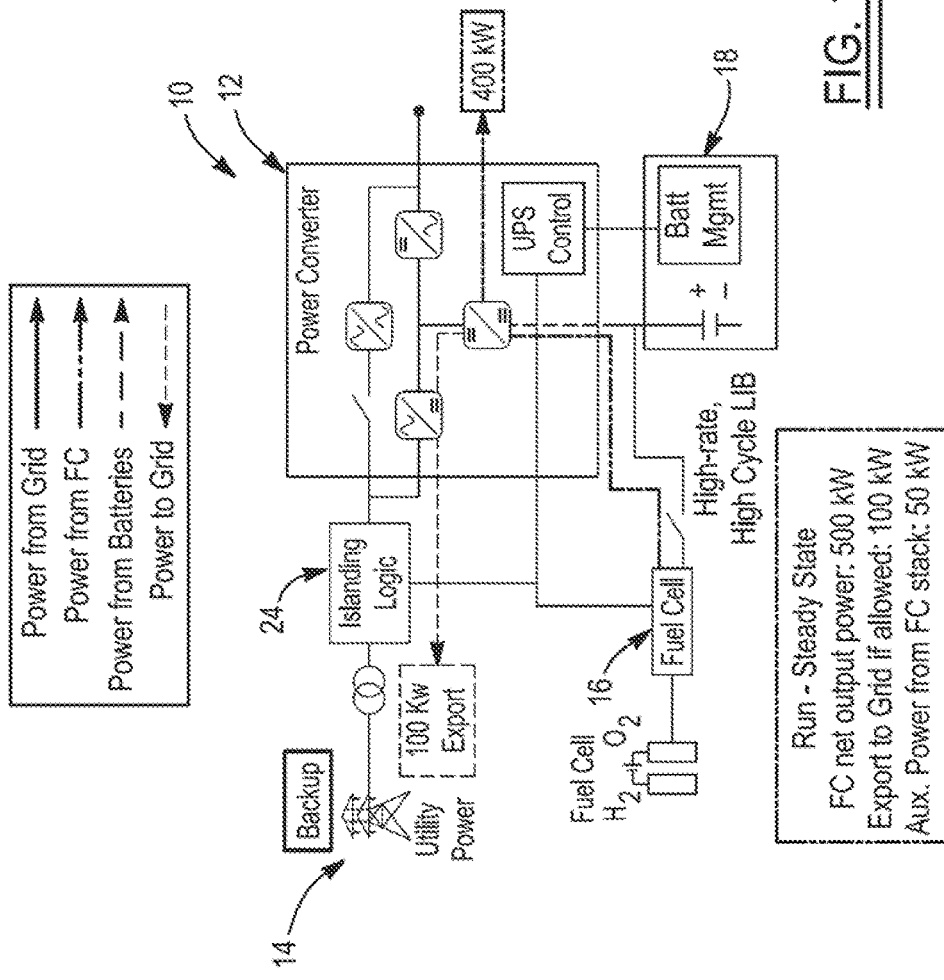
FIG. 17 shows the system as configured in FIG. 1, and where the fuel cell is an SOFC and is working at a steady state producing a constant output power, but the output power exceeds the load requirement, and further, the power converter exports the excess power to the power grid or to the LIBs to reduce the power available to the load to the lesser needed amount.

Referring now to FIG. 17, the system 10 is shown in its configuration as presented in FIG. 1 to describe how excess power from the fuel cell 16 may be diverted when the steady state power of the fuel cell exceeds the requirements of the load, and when the fuel cell 16 is a SOFC. In this example the fuel cell 16 is being used as the primary power source for the load (e.g., supplying 500 kW in this example) and running at a steady state. However, the load requires less than the present steady state output of the fuel cell 16 (e.g., 400 kW in this example). The electronic controller 12e of the power converter 12 detects this condition through its real time monitoring of the load requirements and the output of the fuel cell 16, and controls its internal switching subsystems to divert a portion of the fuel cell's steady state output (i.e., 100 kW in this example) back to the power grid 14. In this scenario the electronic controller 12e knows, typically through a prior communication with the power grid 14 or through preprogrammed information, whether the power grid 14 is available for exporting power to. If the power grid 14 is not available to receive the exported power, the electronic controller 12e of the power converter 12 power may export the power to an external load bank (not shown) or to an additional bank of LIBs (e.g., extended life LIBs; not shown).

Figure 18:
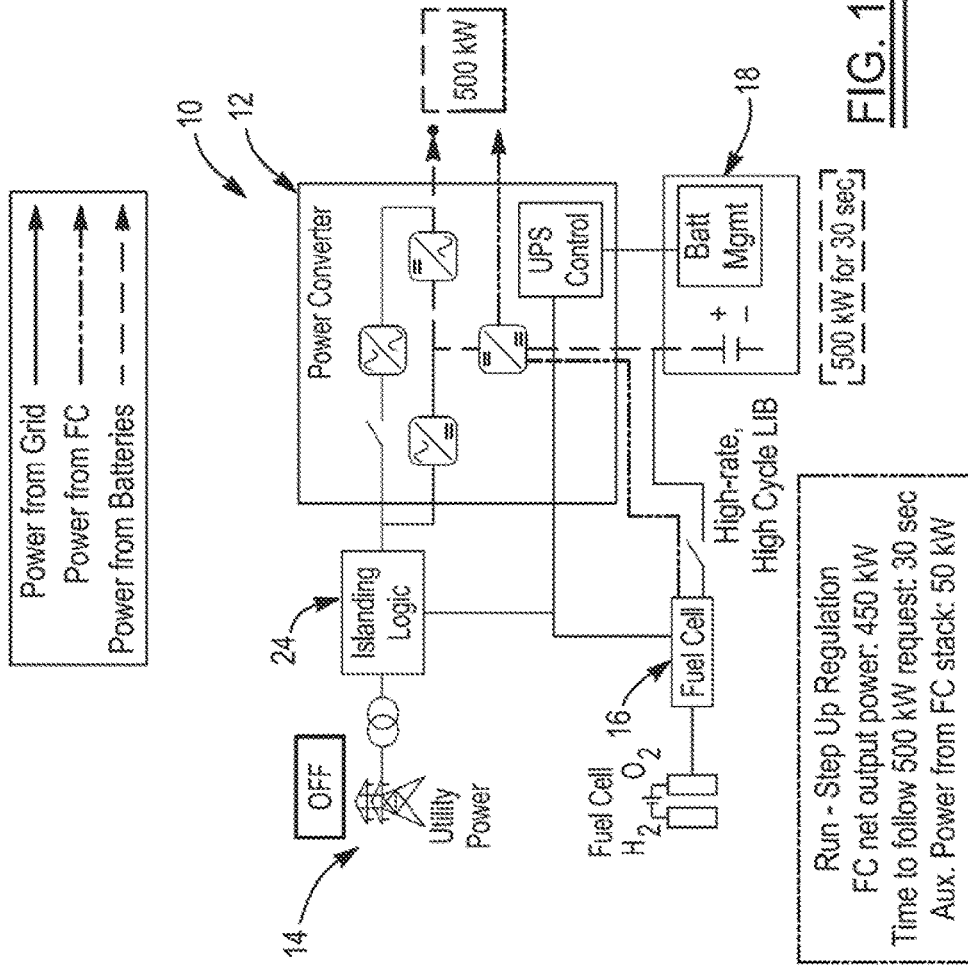
FIG. 18 shows the system as configured in FIG. 1, and where the fuel cell is a PEMFC which is supplying the load when a transient step up load is encountered, and where the power grid is offline, and further showing how the power converter obtains the additional needed short term power for meeting the transient step up load condition from the SBS.

Referring now to FIGS. 18-20, the system 10 of FIG. 1 is shown again to help illustrate another operational scenario where an additional transient load is experienced which requires a rapid step up in the power being provided to the load. In FIG. 18, the power grid 14 is unavailable and the fuel cell 16 is a PEMFC producing all of the power needed for the load (e.g., 450 kW in this example) before the transient load arises. The transient load requires an additional 50 kW. The electronic controller 12e of the power converter 12 detects this transient load in real time, determines in real time the immediate need for an additional 50 kW of power for the load, and queries the electronic controller 18a of the SBS 18 in real time to determine if the SBS 18 has the capacity to supply the needed power (i.e., 50 kW). If the SBS 18 can provide the needed power, then the electronic controller 12e controls the application of an additional 50 kW from the SBS 18 to the output bus 12h, bringing the total power being supplied to the load up to the required amount to fully meet the transient load requirement (i.e., 500 kW total in this example). In practice these actions may occur within seconds or less, and more typically within milliseconds. The SBS 18 supplies the required amount of power until the PEMFC can provide the additional power to fully support the added load (i.e., in 30 seconds in this example).

FIG. 19 shows another example of the system 10 being used to handle the above-described transient step up load scenario, but where the fuel cell 16 is a SOFC providing all of the steady state power (e.g., 450 kW in this example) needed to supply the load before the transient step up load condition (e.g., requiring an additional 50 kW) arises. Since the SOFC is generally not well suited to respond quickly to transient conditions, the electronic controller 12e of the power converter 12 may be pre-programmed to immediately look to other available power sources to obtain the additional power needed to meet the transient load condition. In this example the electronic controller 12e instead uses the power grid 14 to provide the additional needed power (i.e., 50 kW) until the SOFC is able to provide the additional power required to meet the transient load requirements (e.g., in 5 minutes in this example). Power from the grid 14 is available virtually instantly, so the electronic controller 12e is able to obtain and provide this additional power to the load in real time, for example in just seconds or possibly even just milliseconds. In either event, the application of the additional power appears to happen seamlessly to the load.

Referring to FIG. 20, still another example of the system 10, as configured in FIG. 1, is shown to describe the above discussed scenario where a transient increase in the load requirement requires a step up in power, but where the power grid 14 is unavailable but the SBS 18 is available to supply the additional needed power. In this instance the fuel cell 16 is a SOFC and is fully supplying the needed power for the load (e.g., 450 kW) before the need for additional power arises. The electronic controller 12e senses the transient load increase in real time and communicates with the electronic controller 18a of the SBS 18 to determine if the SBS 18 has sufficient capacity to supply the additional required power to fully power the load. If so, then the electronic controller 12 controls its internal switching subsystems to apply the additional needed power (e.g., 50 kW in this example), in real time, to the load to help fully power the load.

FIGS. 21 and 22 show two examples of the system 10, as configured in FIG. 1, for handling the operational scenario where a transient step down in the power needed to power the load is experienced and needs to be handled by the system 10. FIGS. 21 and 22 show the system 10 with the fuel cell 16 being a SOFC. The electronic controller 12*e* of the power converter initially checks the state of charge of the batteries of the SBS 18. If the state of charge is sufficiently low to enable the SBS to receive the excess power, then the electronic controller 12*e* controls the SBS 18 to receive the excess power that the fuel cell 16 provides until it drops from its steady state output (e.g., 500 kW in this example) to the new, lower value (e.g., 450 kW in this example). In the example, the time until the fuel cell 16 is able to supply the new, lower amount of power (e.g., 450 kW) is 5 minutes. It will be appreciated that the operational scenario in FIG. 21 applies also to the PEMFC, but in this instance the fuel cell 16 is capable of reacting quickly to the step down in load (e.g., in 30 seconds).

FIG. 22 shows the system 10 configured as shown in FIG. 1, with the fuel cell 16 being a SOFC, and where the SBS 18 is not available to receive the excess power from the fuel cell during a transient step down scenario. In this instance the electronic controller 12*e* of the power converter 12 is aware of the unavailability of the SBS 18 to receive additional power, for example because the batteries of the SBS 18 are already fully charged. The electronic controller 12*e* instead controls its internal switching subsystems to channel the excess portion of the power from the fuel cell 16 (50 kW in this example) back to the power grid 14. Again, the electronic controller 12*e* may check with the power grid 14 before exporting any excess power back to the power grid, or it may be preprogrammed to know when (i.e., various time periods) the power grid 14 will be available to receive power. The step down in power to the load appears seamless to the load.

Figure 23:
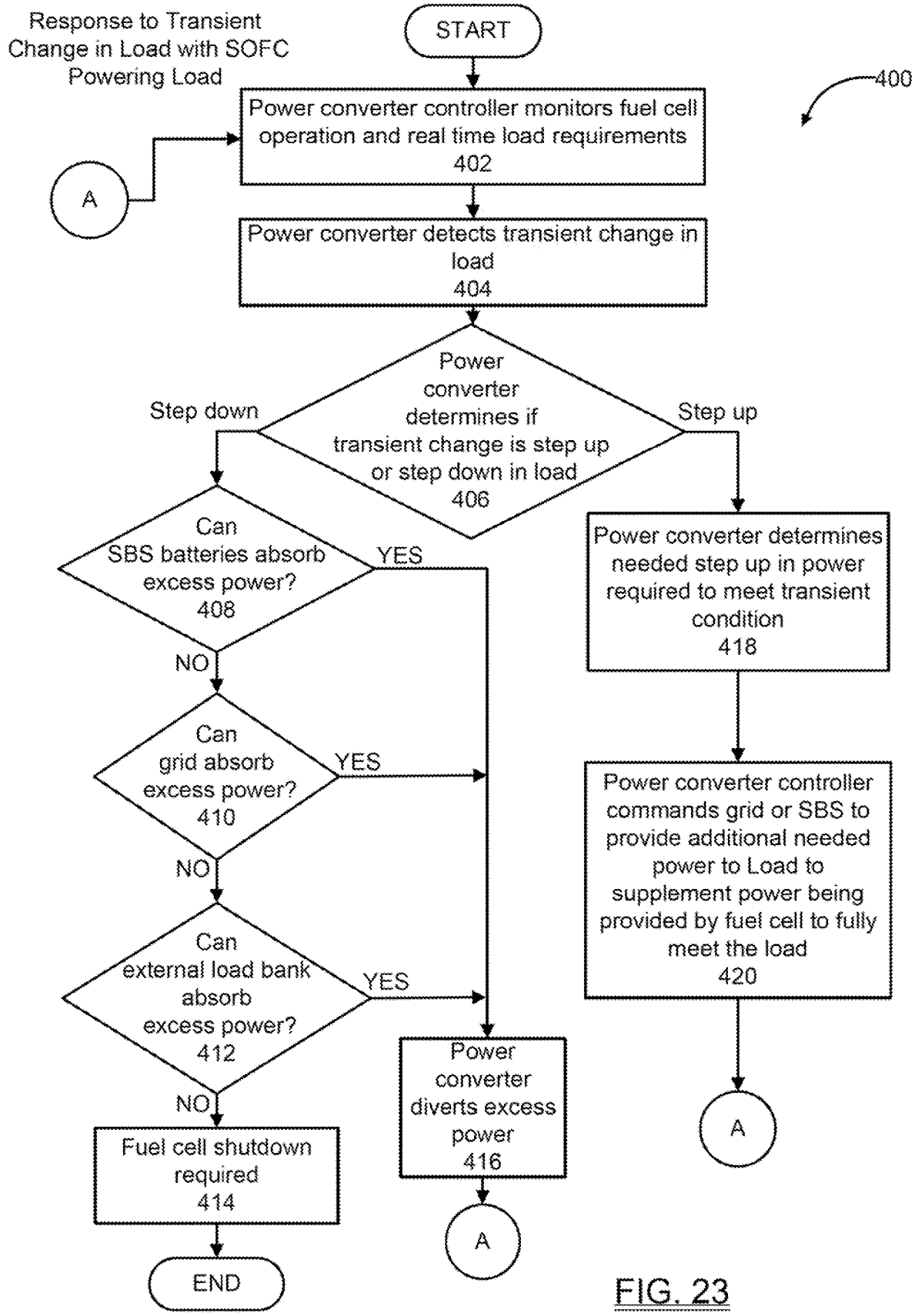
FIG. 23 shows a flowchart to further illustrate various operations in greater detail that may be performed by the power converter's electronic controller in responding to the transient changes in load condition explained in connection with FIGS. 18-22.

FIG. 23 shows a high level flowchart 400 which describes in greater detail the various operations that may be performed by the system 10, configured as shown in FIGS. 19-22, in carrying out the transient load step up and step down operations described above, when the SOFC is powering the load. Initially at operation 402 the electronic controller 12*e* of the power converter 12 monitors the fuel cell 16 operation and real time load requirements. At operation 404 the power converter 12 detects a transient change in the load. At operation 406 the power converter electronic controller 12*e* checks to determine if the transient change is a step up or step down load condition. If a step up load condition is detected, the electronic controller 12*e* determines the needed step up in power required to meet the transient load condition, as indicated at operation 418. At operation 420 the electronic control 12*e* obtains the needed power from the power grid 14 or from the SBS 18 to provide the additional needed power to the load to supplement the power being provided by the fuel cell to fully power the load, as indicated at operation 420. Operations 402 and 404 are then repeated.

If the check at operation 406 detects a step down load condition, the electronic controller 12*e* makes a check if the SBS 18 batteries can absorb the available excess power. If this check produces a "Yes" answer, then at operation 416 the electronic controller 12*e* diverts (i.e., exports) the excess power to the SBS 18, and then operations 402 and 404 may be repeated. However, if the check at operation 408 indicates that the batteries of the SBS 18 are not able to absorb the excess power, then the electronic controller 12*e* makes a check at operation 410 to determine if the power grid 14 is available to absorb the excess power. If this check produces a "Yes" answer, then at operation 416 the power converter diverts the excess power to the power grid 14, and operations 402 and 404 are repeated. If the check at operation 410 indicates that the power grid 14 is not available or otherwise able to receive the excess power, then at operation 412 the electronic controller 12*e* performs a check if an available external load bank (or an extended life LIB) is able to absorb the excess power. If this check produces a "Yes" answer, then the electronic controller 12*e* diverts the excess power to the external load bank, as indicated at operation 416, and then operations 402 and 404 are repeated. However, If the check at operation 412 in FIG. 23 indicates that the external load bank is not able to absorb the excess power, then the electronic controller 12*e* determines that a shutdown of the fuel cell 16 is required, as indicated at operation 414, and subsequently takes the needed actions to command a shutdown of the fuel cell.

Figure 24:
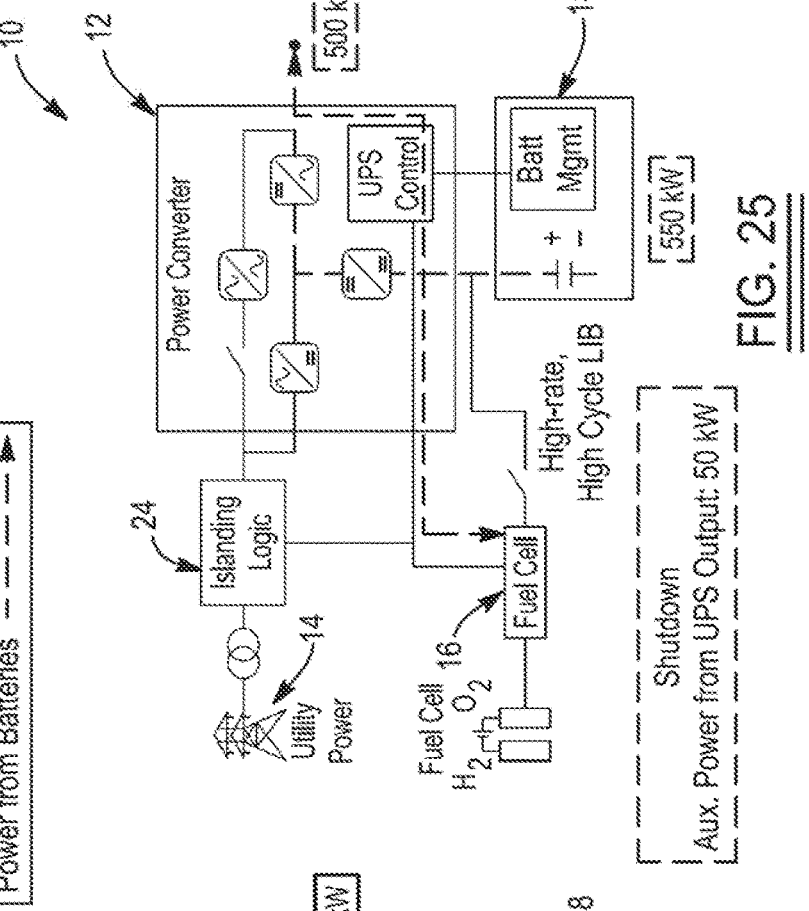
FIG. 24 shows the system configured as presented in FIG. 1, and how the power converter handles a fuel cell shutdown situation which requires an additional amount of power to be obtained and provided to the fuel cell to carry out the shutdown process, and how the power converter obtains the additional needed power from the power grid and diverts the additional needed power to the fuel cell.
Figure 25:
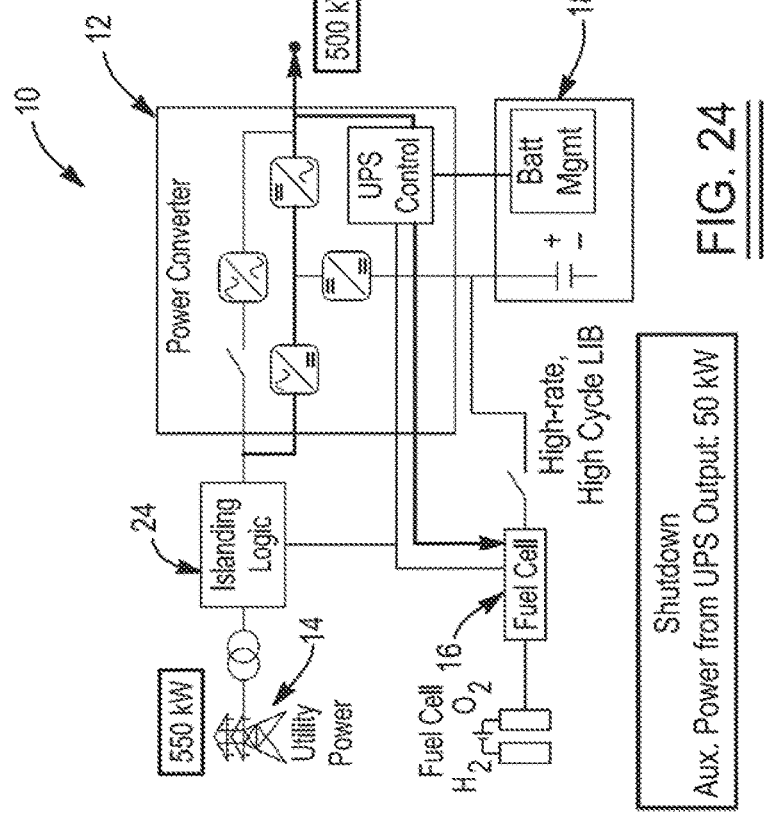
FIG. 25 shows the system of FIG. 24 but where the power converter instead obtains the additional needed power to carry out the fuel cell shutdown process from the SBS.

FIGS. 24 and 25 show how the system 10, as configured in FIG. 1, is controlled during a fuel cell 16 shutdown operation. The operations described for this fuel cell 16 shutdown operation may apply whether the fuel cell is a SOFC or PEMFC, and the shutdown performed may be a controlled, gradual shutdown or an abrupt shutdown. If a controlled, gradual shutdown is needed for the fuel cell 16, then the electronic controller 12*e* of the power converter 12 determines the amount of power needed to maintain the fuel cell 16 BOP for the specific fuel cell 16 being used. Alternatively, the electronic controller 12*e* may be preprogrammed with this information. In either case, the electronic controller 12*e* obtains the total amount of needed power from the power grid 14 to support the load as well as to enable the fuel cell 16 shutdown operation to be carried out while maintaining the BOP. In this example the load requires 500 kW, and the BOP will require 50 kW. Thus, the electronic controller 12*e* obtains 550 kW from the power grid 14 and uses 500 kW to power the load while sending 50 kW to the fuel cell 16 to maintain the BOP while carrying out the shutdown operation.

FIG. 25 shows the system 10 of FIG. 24, but where the power grid 14 is unavailable and the SBS 18 is providing the power to the load. In this example the electronic controller 12*e* checks with the electronic controller 18*a* of the SBS 18 to verify that sufficient extra power (i.e., 50 kW) is available beyond the present 500 kW that it is presently outputting to power the load, in order for the fuel cell 16 shutdown operation to be carried out while maintaining the BOP. If so, the electronic controller 12*e* obtains the additional 50 kW of power from the SBS 18 and controls its internal switching subsystems to route 50 kW of the now 550 kW power being produced to the fuel cell 16. In both scenarios described in FIGS. 24 and 25, the shutdown process is seamless and transparent to the load and is carried out and controlled by the power converter 12.

Figure 26:
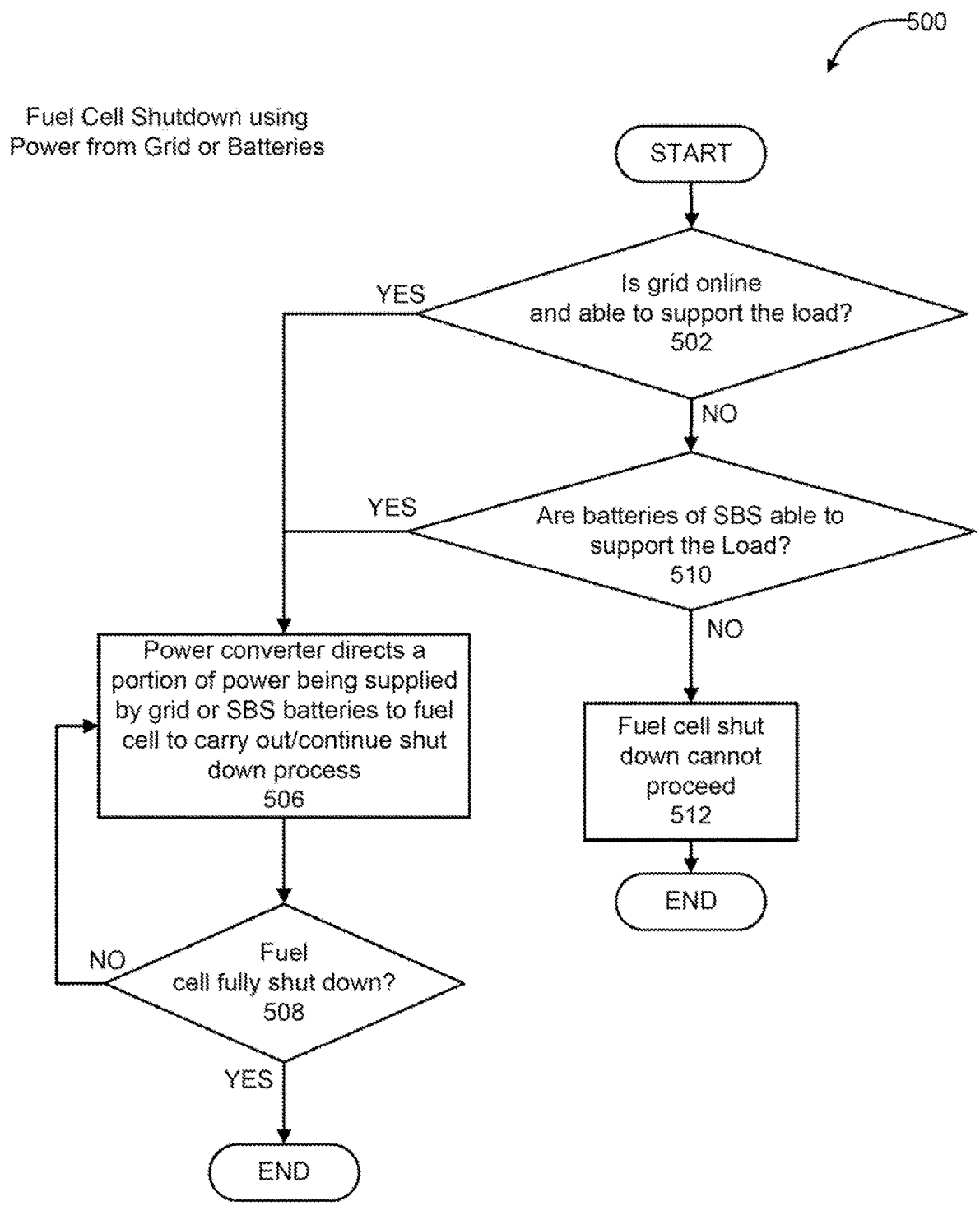
FIG. 26 is a flowchart showing in greater detail various operations that the power converter may perform in prioritizing which ones of two or more available power sources to use in performing a fuel cell shutdown operation.

FIG. 26 shows a flowchart 500 illustrating in further detail one specific sequence of operations to be performed by the system 10 in carrying out the shutdown operations mentioned above in connection with the discussion of FIGS. 24 and 25. At operation 502 in FIG. 26, the electronic controller 12*e* of the power converter 12 initially makes a check to determine if the power grid 14 is online and able to support the load. If this check produces a "No" answer, then at operation 510 the electronic controller 12*e* makes a check to determine if the batteries of the SBS 18 are able to support the load (i.e., if the batteries have sufficient excess capacity to provide the needed auxiliary power). If this check produces a "No" answer, then the electronic controller 12*e* determines that the fuel cell 16 shutdown operation cannot be carried out, as indicated at operation 512, and the shutdown operation is terminated.

With further reference to FIG. 26, if the check at operation 502 indicates that the power grid 14 is available to supply the auxiliary needed power for the shutdown operation, then the electronic controller 12e obtains the additional needed power from the power grid 14 (e.g., 50 kW in this example) and supplies the additional power to the fuel cell 16 to carry out the shutdown operation, as indicated at operation 506, while maintaining the same level of power to the load (e.g., 500 kW in this example). At operation 508 the electronic controller 12e then makes a check to determine if the fuel cell is fully shutdown, and if this produces a "No" answer, then operations 506 and 508 are repeated. Finally, if the check at operation 510 indicates that the batteries of the SBS 18 are available to provide the needed additional power to carry out the fuel cell 16 shutdown operation, then the electronic controller 12e uses the batteries to carry out the subsequent shutdown operations 506-508.

From FIG. 26, it will be appreciated that the electronic controller 12e of the power converter 12 carries out a hierarchical process to determine, in a predetermined hierarchical manner of checks, which of two or more available power sources are available for use, and which have sufficient additional capacity, to provide the additional needed power to carry out the fuel cell shutdown operation. This enables the power converter 12 to intelligently manage and carry out the shutdown operation while making the most efficient use of the power resources available to it at any given time.

The various embodiments described above all enable a power converter to manage virtually all the operations that may arise in powering a load, handling step up and step down transient load conditions, and handling startup and shutdown operations when a fuel cell is being used as a power source. Various hierarchical control schemes are disclosed by which the power converter can make intelligent choices as to which ones of several available power sources are prioritized for use to best handle different operating conditions that arise while powering a load and/or when using different power sources such as fuel cells and supplemental battery systems. A central advantage of the various embodiments described herein is that the power converter can implement a wide variety of different control operations without interrupting or affecting the power being provided to the load. As such, the various control scenarios discussed above can be carried out seamlessly with respect to the load.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for managing available electrical power use from a plurality of available power sources, the system comprising:
an uninterruptible power supply (UPS) having a rectifier circuit, a DC/AC inverter circuit, a DC/DC charger circuit, an AC/AC bypass circuit, a main internal DC bus, and an electronic controller, the UPS providing an AC power output to a load;

an islanding logic subsystem configured to communicate with an AC power grid;

a fuel cell remote from the UPS and having an electronic controller for providing DC power to the UPS;

a supplemental battery subsystem (SBS) having an electronic controller and configured to provide supplemental DC power to the UPS;

a first external bus configured to couple an output of the SBS to the DC/DC charger circuit of the UPS;

a second external bus configured to couple an output of the fuel cell to at least one of the main internal DC bus of the UPS or the first external bus, for providing auxiliary DC power from the fuel cell to the UPS;

a control signal bus configured to communicate control signals between the electronic controller of the UPS, the electronic controller of the fuel cell and the electronic controller of the SBS;

the electronic controller of the UPS being configured to communicate with the electronic controller of the SBS, the electronic controller of the fuel cell and the islanding logic subsystem via the control signal bus, the electronic controller of the UPS thereby configured to enable the UPS to manage a use of available power from at least one of the AC power grid, the fuel cell or the SBS in accordance with a predetermined hierarchical supply power prioritization plan.

2. The system of claim 1, wherein at least one of:
the fuel cell comprises a solid oxide (SO) fuel cell, the hierarchical supply power prioritization plan comprising prioritizing use of the fuel cell for powering the load when the fuel cell is available, and using the AC grid for backup power when the fuel cell is not available to provide the DC power to the UPS; or
the fuel cell comprises a proton exchange membrane (PEM) fuel cell, the hierarchical supply power prioritization plan comprising prioritizing use of the AC power grid for powering the load when the AC power grid is available for use as a power source and using the PEM fuel cell to provide backup power.

3. The system of claim 1, wherein the hierarchical supply power prioritization plan comprises using the SBS to provide power to the UPS to power the load when the AC power grid is offline and unavailable to supply DC power, and when the fuel cell is available to supply DC power to the UPS.

4. The system of claim 1, wherein the electronic controller of the UPS is further configured to carry out a fuel cell startup sequence including:
determining whether the fuel cell requires AC power or DC power for heating up a fuel stack of the fuel cell during the startup sequence;
when the UPS determines that AC power is required to start up the fuel cell and when the AC power grid is available, causing the UPS to use AC power from the AC power grid in generating an AC output from the UPS, the AC output from the UPS applied to the fuel cell to carry out the startup sequence;
when the UPS determines that AC power from the AC power grid is unavailable, the UPS checking if the SBS is presently supporting the load, and further checking a present capacity of the SBS, and when the present capacity of the SBS is determined to be sufficient to carry out the fuel cell startup sequence without disrupting a supply of power to the load, the UPS obtaining additional DC power from the SBS to generate at least one of a DC power output or an AC power output as needed by the fuel cell, for starting up the fuel cell, and applying at least one of the DC power output or the AC power output to the fuel cell to carry out the startup sequence for the fuel cell.

5. The system of claim 1, wherein the electronic controller of the UPS is configured to:
communicate a power set point to the fuel cell when the fuel cell is powered up and available for use but idle, wherein the power set point represents a DC power output from the fuel cell which is required to fully power the load; and
carry out a power walk-in process to gradually transfer the load from the UPS to the fuel cell.

6. The system of claim 1, wherein the electronic controller of the UPS is configured to implement a load sharing plan to:
determine when excess power is available from the fuel cell when the fuel cell is at least partially powering the load; and
when excess power is determined to be available from the fuel cell, to prioritize a transmission of the excess power to one or more of the AC power grid, a mechanical load or the SBS, in accordance with a predetermined excess power prioritization plan.

7. The system of claim 1, wherein the electronic controller of the UPS is configured to manage a transient load increase requiring a step up in power being supplied to the load, while the fuel cell is exclusively powering the load and the AC power grid is not available for use, by:
communicating to the electronic controller of the fuel cell a request for an additional specific quantity of DC power from the fuel cell, the additional specific quantity of DC power needed to meet the transient load increase;
querying the electronic controller of the SBS if the SBS has sufficient capacity to supply the additional specific quantity of DC power; and
when the SBS has sufficient capacity to supply the additional specific quantity of DC power, causing the electronic controller of the UPS to command the electronic controller of the SBS to cause the SBS to deliver the additional specific quantity of DC power to the UPS only for a predetermined time period needed for the fuel cell to ramp up a power output therefrom to supply the additional specific quantity of DC power.

8. The system of claim 7, wherein the fuel cell comprises at least one of a solid oxide fuel cell (SOFC) or a polymer electrolyte membrane (PEM) fuel cell.

9. The system of claim 1, wherein the electronic controller of the UPS is configured to manage a transient load increase requiring a step up in power being supplied to the load, while the fuel cell is exclusively powering the load and the AC power grid is available for use but supplying no power to the load, by:
communicating to the electronic controller of the fuel cell a request for an additional specific quantity of DC power, the additional specific quantity of DC power needed to meet the transient load increase; and
obtaining a predetermined additional quantity of AC power from the AC power grid needed to meet the transient load increase, only for a predetermined time period needed to enable a power output of the fuel cell to ramp up to meet the transient load increase.

10. The system of claim 1, wherein the electronic controller of the UPS is configured to manage a transient load decrease requiring a step down in power being supplied to the load, while the fuel cell is exclusively powering the load and the AC power grid is available but supplying no power to the load, by:

communicating to the electronic controller of the fuel cell a request for a decrease of a specific quantity of DC power, the specific quantity of DC power needed to meet the transient load decrease; and communicating to at least one of the electronic controller of the SBS or to the AC power grid instructions to absorb the specific quantity of DC power being shed by the fuel cell over a predetermined time period.

11. The system of claim 10, wherein the electronic controller of the UPS is configured to communicate with the SBS to check a charge status of the SBS and to determine whether a present charge state of the SBS enables the SBS to receive the specific quantity of DC power being shed by the fuel cell, the electronic controller of the UPS further configured to prioritize use of the SBS to receive the specific quantity of DC power being shed by the fuel cell when the SBS present charge state permits receiving the specific quantity of DC power.

12. The system of claim 10, wherein the electronic controller of the UPS is further configured to check if the AC grid is able to absorb the specific quantity of DC power before directing that the specific quantity of DC power be transmitted to the AC grid, and when the AC grid is unable to receive the specific quantity of DC power, determining if an external load bank is available for use and able to receive the specific quantity of DC power.

13. The system of claim 1, wherein the electronic controller of the UPS is configured to control the UPS to provide the AC power output to the load to power the load, and wherein the AC power output is controllable by the UPS to be greater than needed to power the load to enable a portion of the AC power output from the UPS to be diverted by the UPS to the fuel cell to assist in carrying out a shutdown operation of the fuel cell, while still maintaining the AC power output at a level to fully power the load.

14. The system of claim 13, wherein the UPS is configured to obtain AC power from the AC power grid to generate the AC power output.

15. The system of claim 13, wherein the UPS is configured to obtain DC power from the SBS to generate the AC power output.

16. The system of claim 13, wherein the electronic controller of the UPS is configured to initially check the AC power grid and the SBS to determine whether at least one thereof has sufficient capacity to support the load, before commanding that the portion of the AC power output be diverted to the fuel cell during the shutdown operation of the fuel cell.

17. The system of claim 16, wherein the electronic controller of the UPS is configured to prioritize using the AC power grid over the SBS for obtaining power to generate the AC power output and support the load during the shutdown operation of the fuel cell.

18. The system of claim 17, wherein the electronic controller of the UPS is configured to prevent carrying out the shutdown operation of the fuel cell if neither of the AC grid or the SBS has sufficient power capacity available to provide to the UPS to enable the UPS to continue powering the load while diverting the portion of the AC power output to the fuel cell.

19. A method for managing available electrical power use from a plurality of available power sources, the method comprising:

providing an uninterruptible power supply (UPS) having a main internal DC bus, and an electronic controller, the UPS providing an AC power output to a load;

using the UPS to communicate with an electronic controller of an islanding logic subsystem associated with an AC power grid;

using the UPS to communicate with an electronic controller of a fuel cell remote from the UPS, wherein the fuel cell is configured to provide power to the UPS to at least assist the UPS in powering the load; and using the UPS to communicate with an electronic controller of a supplemental battery subsystem (SBS), where the SBS is configured to selectively provide supplemental DC power to the UPS;

the electronic controller of the UPS being configured to communicate with the electronic controller of the SBS, the electronic controller of the fuel cell and the electronic controller of the islanding logic subsystem to enable the UPS to manage a use of any available power from at least one of the AC power grid, the fuel cell or the SBS in accordance with a predetermined hierarchical supply power prioritization supply plan.

20. The method of claim 19, wherein the electronic controller of the UPS is configured to utilize available power from one or more of the fuel cell, the AC grid or the SBS in accordance with a predetermined hierarchical plan to control at least one of:

a startup of the fuel cell;

a shutdown of the fuel cell;

a response to a transient step up in the load;

a response to a transient step down in the load; or a power walk-in operation for transferring the load from the UPS to the fuel cell.

* * * * *